(12) United States Patent
Kay et al.

(10) Patent No.: US 11,459,277 B2
(45) Date of Patent: Oct. 4, 2022

(54) PROCESS FOR THE PRODUCTION OF MICRONIZED SULFUR

(71) Applicant: Sultech Global Innovation Corp., Crossfield (CA)

(72) Inventors: William Chee Kay, Edmonton (CA); James Kenneth Laidler, Edmonton (CA); Murray MacKinnon, Calgary (CA); Navindra Patel, Calgary (CA)

(73) Assignee: SULTECH GLOBAL INNOVATION CORP., Crossfield (CA)

( * ) Notice: Subject to any disclaimer, the term of this patent is extended or adjusted under 35 U.S.C. 154(b) by 109 days.

(21) Appl. No.: 16/766,961

(22) PCT Filed: Dec. 3, 2018

(86) PCT No.: PCT/CA2018/051544
§ 371 (c)(1),
(2) Date: May 26, 2020

(87) PCT Pub. No.: WO2019/109175
PCT Pub. Date: Jun. 13, 2019

(65) Prior Publication Data
US 2021/0032104 A1 Feb. 4, 2021

Related U.S. Application Data

(60) Provisional application No. 62/594,053, filed on Dec. 4, 2017.

(51) Int. Cl.
*C05D 9/00* (2006.01)
*C05G 5/10* (2020.01)
(Continued)

(52) U.S. Cl.
CPC ............ *C05D 9/00* (2013.01); *C01B 17/0216* (2013.01); *C01B 17/0221* (2013.01);
(Continued)

(58) Field of Classification Search
None
See application file for complete search history.

(56) References Cited

U.S. PATENT DOCUMENTS 4,966,736 A 10/1990 Harbolt et al.
5,788,896 A 8/1998 Bertram et al.
(Continued)

FOREIGN PATENT DOCUMENTS

CA 1040375 10/1978

OTHER PUBLICATIONS

International Search Report of PCT/CA2018/051544; dated Mar. 11, 2019: Pysyk, W.

*Primary Examiner* — Wayne A Langel
(74) *Attorney, Agent, or Firm* — Benoit & Cote Inc.; Mathieu Miron

(57) ABSTRACT

The present document describes a method of producing sulfur particles by injecting an unbroken stream of molten sulfur under a pulsation free pressure, from a distance, into tempered water moving at a velocity, to produce a physical reaction of said molten sulfur with said tempered water to produce sulfur particles. Also described are sulfur particles produced by the process and methods of using the same for fertilizing soil.

22 Claims, 16 Drawing Sheets

(51) Int. Cl.
*C01B 17/02* (2006.01)
*C01B 17/10* (2006.01)
*C05G 5/12* (2020.01)

(52) U.S. Cl.
CPC ................ *C01B 17/10* (2013.01); *C05G 5/10* (2020.02); *C05G 5/12* (2020.02)

(56) References Cited

U.S. PATENT DOCUMENTS 9,522,851 B2 * 12/2016 Abry .................. C05C 3/00
2018/0162781 A1 * 6/2018 Iyer ..................... C05B 7/00

* cited by examiner

PROCESS FOR THE PRODUCTION OF MICRONIZED SULFUR

CROSS REFERENCE TO RELATED APPLICATIONS

This application is a US National Phase application under 35 USC § 371 of PCT/CA2018/051544, filed Dec. 3, 2018, which claims priority from and the benefit of U.S. Provisional Patent Application No. 62/594,053, filed Dec. 4, 2017, the specifications of which are hereby incorporated by reference in their entireties.

BACKGROUND

(a) Field

The subject matter disclosed generally relates to a method for producing sulfur particles. More specifically, the subject matter disclosed relates to a method of producing sulfur particles by injecting an unbroken stream of a molten sulfur under a pressure having reduced or no pulsation into a tempered water moving at velocity, to produce an explosive dispersion of said molten sulfur into sulfur particles.

(b) Related Prior Art

Sulfur (S) is an essential plant nutrient that is especially important for crops like canola that contain high levels of S-based amino acids. The base material for all of these products is elemental sulfur, a bi-product of the oil and gas industry. To be an effective fertilizer, elemental S must be oxidized to the plant-available sulphate ($SO_4^{2-}$) form either through an industrial manufacturing process or a bacteria-mediated biological process in soil. The industrial oxidation of S to $SO_4^{2-}$ requires significant energy inputs. The biological oxidation of S does not require human-produced energy inputs, but it will only occur if S particles are well distributed in soil with ample S-soil contact, and if particles are close to the same size (several micrometers, or microns) as the soil bacteria that complete the process.

Elemental sulfur to be useful as a fertilizer must be converted to the soluble sulphate form. This is accomplished by first being attacked by *Thiobacillus* to produce $H_2S$ followed by oxidation to a $SO_2$ form and finally to sulphate. The sulphate is now in the form required for uptake by the plant. For the *Thiobacillus* to efficiently convert the sulfur to sulphate form within the current growth season it must be in the form which it can thoroughly convert all of the sulfur in that season of application. This is facilitated by exposing the maximum surface to the *Thiobacillus*. Although there are fine sulfur materials being marketed, they are produced through high energy crushing and grinding processes with irregular shapes and low surface area to weight ratios. Spherical shapes have a maximum surface area as opposed to irregular shaped particles of the same particle size. Whereas, the micronized sulfur as produced by the method of the present invention is largely spherical in form resulting in a spheres with a higher surface to weight ratio. This results in a greater surface being exposed to the *Thiobacillus* for faster conversion. As the *Thiobacillus* attacks the particle it becomes smaller and the rate of conversion increases until it is totally converted. Thus original smaller sizes particles are converted earlier in the season while the larger sizes take longer to convert, therefore resulting in conversion later in the growing season.

Ammonium sulphate (AS; 21-0-0-24) is the most widely used S fertilizer. Since the S is in the $SO_4^{2-}$ form, it is plant available as soon as it dissolves in soil moisture, and it can meet crop requirements in the year of application. The major disadvantage of AS is that it is only 24% S, and requires the transportation, distribution, and application of relatively large volumes of fertilizer. Elemental S fertilizers containing up to 90% S (0-0-0-90) are used by some farmers. However, since these elemental S fertilizer granules are usually made up of very large S particles, the sulfur oxidizes slowly and the fertilizer cannot meet crop $SO_4^{2-}$ requirements in the year of application. Generally, elemental S fertilizers must be broadcast-applied one or more years prior to the production of an S-sensitive crop.

It is believed that fine S particle size which allows them to be well dispersed across the application area ensures that elemental S has a large surface area in contact with soil. Many elemental S fertilizers have been marketed with claims of rapid oxidation, but have failed to perform as advertised. Sulfur particles used for agricultural purposes are generally less than 45 microns in size, with a mean granule size of approximately 20 microns. For specific applications, even smaller granule sizes may be required. For example, pesticides generally require a granule size of less than 10 microns, with a mean granule size of approximately 5 microns.

The elemental S fertilizer according to the present invention is a suspension of fine S particles that may be sprayed onto the soil surface rather than delivered as a concentrated dry fertilizer granule. As an elemental S fertilizer in this formulation, it requires considerably less energy to manufacture, producing less $CO_2$ emissions, than AS. Current estimates are that the manufacture of Sulgro™ 70 produces 0.108 kg $CO_2$e per kg S, compared to 2.42 kg $CO_2$e per kg S for AS. Both emission estimates are based on product ready to leave the manufacturing plant and do not include emissions during distribution and application. Assuming 2.4 million hectares (6 million acres) of canola production annually in Alberta, and an assumed S fertilization rate of 15 kg S per hectare, if the S fertilizer according to the present invention were to replace AS as the S fertilizer on all canola production, $CO_2$e emissions would be reduced by about 84,000 T $CO_2$e annually from the manufacturing process alone (ignoring the energy associated with the N fertilizer needed to replace N in AS). When $CO_2$e emissions are taxed at $50 per T, the S fertilizer according to the present invention could potentially save rural Alberta economies just over $4 million annually in carbon taxes, assuming manufacturing carbon taxes are passed along to fertilizer users.

U.S. Pat. No. 5,788,896 to Bertram et al describes a method of producing micron sized sulfur particles by directing stream of molten sulfur in tempered water at a velocity. At the contact of water, the sulfur streams disperses explosively into fine sulfur particles of general size of 70 microns or below, depending of the production conditions. However, although the method disclosed in Bertram et al is enabling for the production of particles over a wide range of sizes from below 70 microns to sub-micron size, it is difficult to obtain micron sized particles over specific and narrower size ranges from this method in a consistent manner.

Therefore, there is a need for a method that is capable of consistently producing an output of sulfur particles, the vast majority of which are within desired narrow micron ranges.

According to the present invention there is provided a method of producing sulfur particles that improve or at least mitigate the disadvantages of the prior art.

SUMMARY

According to an embodiment, there is provided a method of producing sulfur particles, comprising the step of injecting an unbroken stream of a molten sulfur under a pulsation free pressure of from about 3447.38 kPa to about 20684.27 kPa, from a distance of about 30 to about 101 mm, into a tempered water moving at velocity, to produce a physical reaction of the molten sulfur with the tempered water to produce sulfur particles.

The pulsation free pressure may be from a pump having reduced pulsations compared to a pump having a single, or dual high pressure hydraulic cylinder.

The molten sulfur may be degassed molten sulfur.

The pulsation free pressure may be provided with a pump having 3 or more hydraulic cylinders.

The distance may be from about 30 to about 76 mm. The distance may be from about 33 to about 76 mm. The distance may be 33 mm.

The molten sulfur may be heated to a temperature of about 140° C. to about 159° C. The molten sulfur heated to a temperature of about 150° C. to about 155° C.

The tempered water may be heated to a temperature of about 15° C. to about 98° C. The tempered water may be heated to a temperature of about 50° C. to about 98° C. The tempered water may be heated to a temperature of about 94° C. to about 98° C.

The tempered water may be moving at velocity sufficient to produce a vortex.

The tempered water may be moving at velocity of at least 0.5 meter per second.

The tempered water further comprises a surfactant.

The surfactant may be carboxymethyl cellulose having a low degree of substitution.

The carboxymethyl cellulose having a low degree of substitution may have a degree of substitution of equal to or less than 0.5. The carboxymethyl cellulose having a low degree of substitution may have a degree of substitution of between about 0.4 to 0.5. The carboxymethyl cellulose having a low degree of substitution may have a degree of substitution of between about 0.4 and 0.45.

The moving at a velocity comprises driving the tempered water in a circular motion with sufficient angular velocity as to produce a vortex.

The vortex may be provided by a dual impeller vertical mixer.

The dual impeller vertical mixer comprises an upper impeller configured to induce a smooth laminar flow across the liquid surface of the tempered water.

The dual impeller vertical mixer comprises a lower impeller configured to create a tight vortex of micronized sulfur slurry to assist flow of the sulfur particles.

The moving at a velocity provides a homogeneous sulfur particles and water slurry.

The homogenous sulfur particles and water slurry comprises about 10% w/w sulfur particles.

The method may further comprise the step of filtering the sulfur particles or the homogeneous sulfur particles and water slurry for retention of coarse sulfur particles and providing filtered sulfur particles or a filtered homogeneous sulfur particles and water slurry.

The filtering may be with a filter of about 150 µm (100 mesh).

The method may further comprise the step of centrifugation of the filtered sulfur particles or the filtered homogeneous sulfur particles and water slurry to provide a wet elemental sulfur paste and a white water.

The white water may be treated to recover fine sulfur particles for further processing.

According to another embodiment, there may be provided a sulfur particle produced by the process of the present invention.

The sulfur particle may have a diameter of 70 µm or smaller. The sulfur particle of may have a diameter of 45 µm or smaller. The sulfur particle may have a diameter of 19 µm or smaller. The sulfur particle may have an average diameter of 19 µm.

The sulfur particle may have a particle size distribution of from about 2 µm to about 45 µm.

The sulfur particle may have a surface weight mean (SWM-D[3,2]) of from about 13 µm to about 21 µm.

The sulfur particle may have a volume weight mean (VWM-D[4,3]) of from about 22 µm to about 28 µm.

According to another embodiment, there may be provided a sulfur particle having a diameter of 70 µm or smaller. The sulfur particle may have a diameter of 45 µm or smaller. The sulfur particle may have a diameter of 19 µm or smaller. The sulfur particle may have an average diameter of 19 µm.

The sulfur particle may have a particle size distribution of from about 2 µm to about 45 µm.

The sulfur particle may have a surface weight mean (SWM-D[3,2]) of from about 13 µm to about 21 µm.

The sulfur particle may have a volume weight mean (VWM-D[4,3]) of from about 22 µm to about 28 µm.

The sulfur particle may further comprise a surfactant.

The surfactant may be carboxymethyl cellulose.

The carboxymethyl cellulose may be carboxymethyl cellulose having a low degree of substitution.

The carboxymethyl cellulose having a low degree of substitution may have a degree of substitution of less than 0.5. The carboxymethyl cellulose having a low degree of substitution may have a degree of substitution of between about 0.4 to 0.5. The carboxymethyl cellulose having a low degree of substitution may have a degree of substitution of between about 0.4 and 0.45.

According to another embodiment, there is provided a sulfur fertilizer comprising a sulfur particle according to the present invention and a suitable carrier.

The sulfur fertilizer may further comprise an additional nutritional element.

The additional nutritional element may be Nitrogen (N), Phosphorus (P), Potassium (K) or combinations thereof.

The suitable carrier may be a sodium lignosulfate, a bentonite clay, or combinations thereof.

The sodium lignosulfate may be present at about 2% to about 3% w/w of the fertilizer.

The bentonite clay may be present at about 4% to about 5% w/w of the fertilizer.

The sulfur fertilizer may be a pellet.

The pellet may have a diameter of about 1 mm to about 4 mm.

According to another embodiment, there is provided a method of fertilizing a soil comprising contacting the soil with the sulfur particle of the present invention, the sulfur fertilizer of the present invention, or combinations thereof.

The contacting the soil may be with the sulfur particle of the present invention.

The contacting the soil may be with the sulfur fertilizer of the present invention.

According to another embodiment, there is provided a sulfur particle suspension comprising about 5% to about 10% w/w sulfur particle produced by the process of the present invention, having a diameter of 10 µm or smaller, a surfactant, and water to 100% w/w.

The surfactant may be carboxymethyl cellulose.

The carboxymethyl cellulose may be carboxymethyl cellulose having a low degree of substitution.

The carboxymethyl cellulose having a low degree of substitution may have a degree of substitution of less than 0.5. The carboxymethyl cellulose having a low degree of substitution may have a degree of substitution of between about 0.4 to 0.5. The carboxymethyl cellulose having a low degree of substitution may have a degree of substitution of between about 0.4 and 0.45.

The surfactant may be from about 0.01% to about 1% w/w of the suspension.

According to another embodiment, there may be provided a method of treating a pest comprising contacting the pest with a pesticidal amount of the sulfur particle suspension of the present invention.

The following terms are defined below.

The term "sulfur" is intended to mean the chemical element with symbol S and atomic number 16. It is an abundant, multivalent, and nonmetallic element. Under normal conditions, sulfur atoms form cyclic octatomic molecules with a chemical formula S8. Elemental sulfur is a bright yellow crystalline solid at room temperature. Chemically, sulfur reacts with all elements except for gold, platinum, iridium, tellurium, and the noble gases. Sulfur is an essential element for all life, but almost always in the form of organosulfur compounds or metal sulfides. Three amino acids (cysteine, cystine, and methionine) and two vitamins (biotin and thiamine) are organosulfur compounds. Many cofactors also contain sulfur including glutathione and thioredoxin and iron-sulfur proteins. Disulfides, S—S bonds, confer mechanical strength and insolubility of the protein keratin, found in outer skin, hair, and feathers. Sulfur is one of the core chemical elements needed for biochemical functioning and is an elemental macronutrient for all living organisms.

The terms "granules of sulfur", "sulfur granules", "micronized sulfur granules", and/or "micron sized sulfur granules" or "particles of sulfur", "sulfur particles", "micronized sulfur particles", and/or "micron sized sulfur particles" are intended to mean small compact particles of elemental sulfur, preferably spherical or substantially spherical. The particles of the present invention may be of any suitable size, but are on average of a diameter of about 70 µm or smaller, preferably of about 45 µm or smaller, most preferably of about 30 µm or smaller, of about 29 µm or smaller, of about 28 µm or smaller, of about 27 µm or smaller, of about 26 µm or smaller, of about 25 µm or smaller, of about 24 µm or smaller, of about 23 µm or smaller, of about 22 µm or smaller, of about 21 µm or smaller, of about 20 µm or smaller, or about 19 µm or smaller, or about 18 µm or smaller, or about 17 µm or smaller, or about 16 µm or smaller, or about 15 µm or smaller, or about 14 µm or smaller, or about 13 µm or smaller, or about 12 µm or smaller, or about 11 µm or smaller, or about 10 µm or smaller, or about 9 µm or smaller, or about 8 µm or smaller, or about 7 µm or smaller, or smaller about 6 µm or smaller, or about 5 µm or smaller, or about 4 µm or smaller, or about 3 µm or smaller, or about 2 µm or smaller, or about 1 µm or smaller, or about 30 µm, or about 29 µm, or about 28 µm, or about 27 µm, or about 26 µm, or about 25 µm, about 24 µm, or about 23 µm, or about 22 µm, or about 21 µm, or about 20 µm, or about 19 µm, or about 18 µm, or about 17 µm, or about 16 µm, or about 15 µm, or about 14 µm, or about 13 µm, or about 12 µm, or about 11 µm, or about 10 µm, or about 9 µm, or about 8 µm, or about 7 µm, or about 6 µm, or about 5 µm, or about 4 µm, or about 3 µm, or about 2 µm, or about 1 µm, and even of sub-micron size.

In embodiments, the particle size distribution may be from about 1 µm to about 200 µm, or from about 2 µm to about 200 µm, or from about 3 µm to about 200 µm, or from about 4 µm to about 200 µm, or from about 5 µm to about 200 µm, or from about 6 µm to about 200 µm, or from about 7 µm to about 200 µm, or from about 8 µm to about 200 µm, or from about 9 µm to about 200 µm, or from about 10 µm to about 200 µm, or from about 11 µm to about 200 µm, or from about 12 µm to about 200 µm, or from about 13 µm to about 200 µm, or from about 14 µm to about 200 µm, or from about 15 µm to about 200 µm, or from about 16 µm to about 200 µm, or from about 17 µm to about 200 µm, or from about 18 µm to about 200 µm, or from about 19 µm to about 200 µm, or from about 20 µm to about 200 µm, or from about 21 µm to about 200 µm, or from about 22 µm to about 200 µm, or from about 23 µm to about 200 µm, or from about 24 µm to about 200 µm, or from about 25 µm to about 200 µm, or from about 26 µm to about 200 µm, or from about 27 µm to about 200 µm, or from about 28 µm to about 200 µm, or from about 29 µm to about 200 µm, or from about 30 µm to about 200 µm, or from about 35 µm to about 200 µm, or from about 40 µm to about 200 µm, or from about 45 µm to about 200 µm, or from about 50 µm to about 200 µm, or from about 55 µm to about 200 µm, or from about 60 µm to about 200 µm, or from about 65 µm to about 200 µm, or from about 70 µm to about 200 µm, or from about 75 µm to about 200 µm, or from about 80 µm to about 200 µm, or from about 85 µm to about 200 µm, or from about 90 µm to about 200 µm, or from about 95 µm to about 200 µm, or from about 100 µm to about 200 µm, or from about 110 µm to about 200 µm, or from about 120 µm to about 200 µm, or from about 130 µm to about 200 µm, or from about 140 µm to about 200 µm, or from about 150 µm to about 200 µm, or from about 160 µm to about 200 µm, or from about 170 µm to about 200 µm, or from about 180 µm to about 200 µm, or from about 190 µm to about 200 µm, or from about 1 µm to about 70 µm, or from about 2 µm to about 70 µm, or from about 3 µm to about 70 µm, or from about 4 µm to about 70 µm, or from about 5 µm to about 70 µm, or from about 6 µm to about 70 µm, or from about 7 µm to about 70 µm, or from about 8 µm to about 70 µm, or from about 9 µm to about 70 µm, or from about 10 µm to about 70 µm, or from about 11 µm to about 70 µm, or from about 12 µm to about 70 µm, or from about 13 µm to about 70 µm, or from about 14 µm to about 70 µm, or from about 15 µm to about 70 µm, or from about 16 µm to about 70 µm, or from about 17 µm to about 70 µm, or from about 18 µm to about 70 µm, or from about 19 µm to about 70 µm, or from about 20 µm to about 70 µm, or from about 21 µm to about 70 µm, or from about 22 µm to about 70 µm, or from about 23 µm to about 70 µm, or from about 24 µm to about 70 µm, or from about 25 µm to about 70 µm, or from about 26 µm to about 70 µm, or from about 27 µm to about 70 µm, or from about 28 µm to about 70 µm, or from about 29 µm to about 70 µm, or from about 30 µm to about 70 µm, or from about 35 µm to about 70 µm, or from about 40 µm to about 70 µm, or from about 45 µm to about 70 µm, or from about 50 µm to about 70 µm, or from about 55 µm to about 70 µm, or from about 60 µm to about 70 µm, or from about 65 µm to about 70 µm, or from about 1 µm to about 65 µm, or from about 2 µm to about 65 µm, or from about 3 µm to about 65 µm, or from about 4 µm to about 65 µm, or from about 5 µm to about 65 µm, or from about 6 µm to about 65 µm, or from about 7 µm to about 65 µm, or from about 8 µm to about 65 µm, or from about 9 µm to about 65 µm, or from about 10

µm to about 65 µm, or from about 11 µm to about 65 µm, or from about 12 µm to about 65 µm, or from about 13 µm to about 65 µm, or from about 14 µm to about 65 µm, or from about 15 µm to about 65 µm, or from about 16 µm to about 65 µm, or from about 17 µm to about 65 µm, or from about 18 µm to about 65 µm, or from about 19 µm to about 65 µm, or from about 20 µm to about 65 µm, or from about 21 µm to about 65 µm, or from about 22 µm to about 65 µm, or from about 23 µm to about 65 µm, or from about 24 µm to about 65 µm, or from about 25 µm to about 65 µm, or from about 26 µm to about 65 µm, or from about 27 µm to about 65 µm, or from about 28 µm to about 65 µm, or from about 29 µm to about 65 µm, or from about 30 µm to about 65 µm, or from about 35 µm to about 65 µm, or from about 40 µm to about 65 µm, or from about 45 µm to about 65 µm, or from about 50 µm to about 65 µm, or from about 55 µm to about 65 µm, or from about 60 µm to about 65 µm, or from about 1 µm to about 60 µm, or from about 2 µm to about 60 µm, or from about 3 µm to about 60 µm, or from about 4 µm to about 60 µm, or from about 5 µm to about 60 µm, or from about 6 µm to about 60 µm, or from about 7 µm to about 60 µm, or from about 8 µm to about 60 µm, or from about 9 µm to about 60 µm, or from about 10 µm to about 60 µm, or from about 11 µm to about 60 µm, or from about 12 µm to about 60 µm, or from about 13 µm to about 60 µm, or from about 14 µm to about 60 µm, or from about 15 µm to about 60 µm, or from about 16 µm to about 60 µm, or from about 17 µm to about 60 µm, or from about 18 µm to about 60 µm, or from about 19 µm to about 60 µm, or from about 20 µm to about 60 µm, or from about 21 µm to about 60 µm, or from about 22 µm to about 60 µm, or from about 23 µm to about 60 µm, or from about 24 µm to about 60 µm, or from about 25 µm to about 60 µm, or from about 26 µm to about 60 µm, or from about 27 µm to about 60 µm, or from about 28 µm to about 60 µm, or from about 29 µm to about 60 µm, or from about 30 µm to about 60 µm, or from about 35 µm to about 60 µm, or from about 40 µm to about 60 µm, or from about 45 µm to about 60 µm, or from about 50 µm to about 60 µm, or from about 55 µm to about 60 µm, or from about 1 µm to about 55 µm, or from about 2 µm to about 55 µm, or from about 3 µm to about 55 µm, or from about 4 µm to about 55 µm, or from about 5 µm to about 55 µm, or from about 6 µm to about 55 µm, or from about 7 µm to about 55 µm, or from about 8 µm to about 55 µm, or from about 9 µm to about 55 µm, or from about 10 µm to about 55 µm, or from about 11 µm to about 55 µm, or from about 12 µm to about 55 µm, or from about 13 µm to about 55 µm, or from about 14 µm to about 55 µm, or from about 15 µm to about 55 µm, or from about 16 µm to about 55 µm, or from about 17 µm to about 55 µm, or from about 18 µm to about 55 µm, or from about 19 µm to about 55 µm, or from about 20 µm to about 55 µm, or from about 21 µm to about 55 µm, or from about 22 µm to about 55 µm, or from about 23 µm to about 55 µm, or from about 24 µm to about 55 µm, or from about 25 µm to about 55 µm, or from about 26 µm to about 55 µm, or from about 27 µm to about 55 µm, or from about 28 µm to about 55 µm, or from about 29 µm to about 55 µm, or from about 30 µm to about 55 µm, or from about 35 µm to about 55 µm, or from about 40 µm to about 55 µm, or from about 45 µm to about 55 µm, or from about 50 µm to about 55 µm, or from about 1 µm to about 50 µm, or from about 2 µm to about 50 µm, or from about 3 µm to about 50 µm, or from about 4 µm to about 50 µm, or from about 5 µm to about 50 µm, or from about 6 µm to about 50 µm, or from about 7 µm to about 50 µm, or from about 8 µm to about 50 µm, or from about 9 µm to about 50 µm, or from about 10 µm to about 50 µm, or from about 11 µm to about 50 µm, or from about 12 µm to about 50 µm, or from about 13 µm to about 50 µm, or from about 14 µm to about 50 µm, or from about 15 µm to about 50 µm, or from about 16 µm to about 50 µm, or from about 17 µm to about 50 µm, or from about 18 µm to about 50 µm, or from about 19 µm to about 50 µm, or from about 20 µm to about 50 µm, or from about 21 µm to about 50 µm, or from about 22 µm to about 50 µm, or from about 23 µm to about 50 µm, or from about 24 µm to about 50 µm, or from about 25 µm to about 50 µm, or from about 26 µm to about 50 µm, or from about 27 µm to about 50 µm, or from about 28 µm to about 50 µm, or from about 29 µm to about 50 µm, or from about 30 µm to about 50 µm, or from about 35 µm to about 50 µm, or from about 40 µm to about 50 µm, or from about 45 µm to about 50 µm, or from about 1 µm to about 45 µm, or from about 2 µm to about 45 µm, or from about 3 µm to about 45 µm, or from about 4 µm to about 45 µm, or from about 5 µm to about 45 µm, or from about 6 µm to about 45 µm, or from about 7 µm to about 45 µm, or from about 8 µm to about 45 µm, or from about 9 µm to about 45 µm, or from about 10 µm to about 45 µm, or from about 11 µm to about 45 µm, or from about 12 µm to about 45 µm, or from about 13 µm to about 45 µm, or from about 14 µm to about 45 µm, or from about 15 µm to about 45 µm, or from about 16 µm to about 45 µm, or from about 17 µm to about 45 µm, or from about 18 µm to about 45 µm, or from about 19 µm to about 45 µm, or from about 20 µm to about 45 µm, or from about 21 µm to about 45 µm, or from about 22 µm to about 45 µm, or from about 23 µm to about 45 µm, or from about 24 µm to about 45 µm, or from about 25 µm to about 45 µm, or from about 26 µm to about 45 µm, or from about 27 µm to about 45 µm, or from about 28 µm to about 45 µm, or from about 29 µm to about 45 µm, or from about 30 µm to about 45 µm, or from about 35 µm to about 45 µm, or from about 40 µm to about 45 µm, or from about 1 µm to about 40 µm, or from about 2 µm to about 40 µm, or from about 3 µm to about 40 µm, or from about 4 µm to about 40 µm, or from about 5 µm to about 40 µm, or from about 6 µm to about 40 µm, or from about 7 µm to about 40 µm, or from about 8 µm to about 40 µm, or from about 9 µm to about 40 µm, or from about 10 µm to about 40 µm, or from about 11 µm to about 40 µm, or from about 12 µm to about 40 µm, or from about 13 µm to about 40 µm, or from about 14 µm to about 40 µm, or from about 15 µm to about 40 µm, or from about 16 µm to about 40 µm, or from about 17 µm to about 40 µm, or from about 18 µm to about 40 µm, or from about 19 µm to about 40 µm, or from about 20 µm to about 40 µm, or from about 21 µm to about 40 µm, or from about 22 µm to about 40 µm, or from about 23 µm to about 40 µm, or from about 24 µm to about 40 µm, or from about 25 µm to about 40 µm, or from about 26 µm to about 40 µm, or from about 27 µm to about 40 µm, or from about 28 µm to about 40 µm, or from about 29 µm to about 40 µm, or from about 30 µm to about 40 µm, or from about 35 µm to about 40 µm, or from about 1 µm to about 35 µm, or from about 2 µm to about 35 µm, or from about 3 µm to about 35 µm, or from about 4 µm to about 35 µm, or from about 5 µm to about 35 µm, or from about 6 µm to about 35 µm, or from about 7 µm to about 35 µm, or from about 8 µm to about 35 µm, or from about 9 µm to about 35 µm, or from about 10 µm to about 35 µm, or from about 11 µm to about 35 µm, or from about 12 µm to about 35 µm, or from about 13 µm to about 35 µm, or from about 14 µm to about 35 µm, or from about 15 µm to about 35 µm, or from about 16 µm to about 35 µm, or from about 17 µm to about 35 µm, or from about 18 µm to about 35 µm, or from about 19 µm to about 35 µm, or from about 20 µm to about 35 µm, or from about 21 µm to about 35 µm, or from about 22 µm to about 35 µm, or from about 23 µm to about 35 µm, or from about 24 µm to about 35 µm, or from about 25 µm to about 35 µm, or from about 26 µm to about 35 µm, or from about 27 µm to about 35 µm, or from about 28 µm to about 35 µm, or from about 29 µm to about 35 µm, or from about 30 µm to about 35 µm, or from about 1 µm to about 30 µm, or from about 2 µm to about 30 µm, or from about 3 µm to about 30 µm, or from about 4 µm to about 30 µm, or from about 5 µm to about 30 µm, or from about 6 µm to about 30 µm, or from about 7 µm to about 30 µm, or from about 8 µm to about 30 µm, or from about 9 µm to about 30 µm, or from about 10 µm to about 30 µm, or from about 11 µm to about 30 µm, or from about 12 µm to about 30 µm, or from about 13 µm to about 30 µm, or from about 14 µm to about 30 µm, or from about 15 µm to about 30 µm, or from about 16 µm to about 30 µm, or from about 17 µm to about 30 µm, or from about 18 µm to about 30 µm, or from about 19 µm to about 30 µm, or from about 20 µm to about 30 µm, or from about 21 µm to about 30 µm, or from about 22 µm to about 30 µm, or from about 23 µm to about 30 µm, or from about 24 µm to about 30 µm, or from about 25 µm to about 30 µm, or from about 26 µm to about 30 µm, or from about 27 µm to about 30 µm, or from about 28 µm to about 30 µm, or from about 29 µm to about 30 µm, or from about 1 µm to about 29 µm, or from about 2 µm to about 29 µm, or from about 3 µm to about 29 µm, or from about 4 µm to about 29 µm, or from about 5 µm to about 29 µm, or from about 6 µm to about 29 µm, or from about 7 µm to about 29 µm, or from about 8 µm to about 29 µm, or from about 9 µm to about 29 µm, or from about 10 µm to about 29 µm, or from about 11 µm to about 29 µm, or from about 12 µm to about 29 µm, or from about 13 µm to about 29 µm, or from about 14 µm to about 29 µm, or from about 15 µm to about 29 µm, or from about 16 µm to about 29 µm, or from about 17 µm to about 29 µm, or from about 18 µm to about 29 µm, or from about 19 µm to about 29 µm, or from about 20 µm to about 29 µm, or from about 21 µm to about 29 µm, or from about 22 µm to about 29 µm, or from about 23 µm to about 29 µm, or from about 24 µm to about 29 µm, or from about 25 µm to about 29 µm, or from about 26 µm to about 29 µm, or from about 27 µm to about 29 µm, or from about 28 µm to about 29 µm, or from about 1 µm to about 28 µm, or from about 2 µm to about 28 µm, or from about 3 µm to about 28 µm, or from about 4 µm to about 28 µm, or from about 5 µm to about 28 µm, or from about 6 µm to about 28 µm, or from about 7 µm to about 28 µm, or from about 8 µm to about 28 µm, or from about 9 µm to about 28 µm, or from about 10 µm to about 28 µm, or from about 11 µm to about 28 µm, or from about 12 µm to about 28 µm, or from about 13 µm to about 28 µm, or from about 14 µm to about 28 µm, or from about 15 µm to about 28 µm, or from about 16 µm to about 28 µm, or from about 17 µm to about 28 µm, or from about 18 µm to about 28 µm, or from about 19 µm to about 28 µm, or from about 20 µm to about 28 µm, or from about 21 µm to about 28 µm, or from about 22 µm to about 28 µm, or from about 23 µm to about 28 µm, or from about 24 µm to about 28 µm, or from about 25 µm to about 28 µm, or from about 26 µm to about 28 µm, or from about 27 µm to about 28 µm, or from about 1 µm to about 27 µm, or from about 2 µm to about 27 µm, or from about 3 µm to about 27 µm, or from about 4 µm to about 27 µm, or from about 5 µm to about 27 µm, or from about 6 µm to about 27 µm, or from about 7 µm to about 27 µm, or from about 8 µm to about 27 µm, or from about 9 µm to about 27 µm, or from about 10 µm to about 27 µm, or from about 11 µm to about 27 µm, or from about 12 µm to about 27 µm, or from about 13 µm to about 27 µm, or from about 14 µm to about 27 µm, or from about 15 µm to about 27 µm, or from about 16 µm to about 27 µm, or from about 17 µm to about 27 µm, or from about 18 µm to about 27 µm, or from about 19 µm to about 27 µm, or from about 20 µm to about 27 µm, or from about 21 µm to about 27 µm, or from about 22 µm to about 27 µm, or from about 23 µm to about 27 µm, or from about 24 µm to about 27 µm, or from about 25 µm to about 27 µm, or from about 26 µm to about 27 µm, or from about 1 µm to about 26 µm, or from about 2 µm to about 26 µm, or from about 3 µm to about 26 µm, or from about 4 µm to about 26 µm, or from about 5 µm to about 26 µm, or from about 6 µm to about 26 µm, or from about 7 µm to about 26 µm, or from about 8 µm to about 26 µm, or from about 9 µm to about 26 µm, or from about 10 µm to about 26 µm, or from about 11 µm to about 26 µm, or from about 12 µm to about 26 µm, or from about 13 µm to about 26 µm, or from about 14 µm to about 26 µm, or from about 15 µm to about 26 µm, or from about 16 µm to about 26 µm, or from about 17 µm to about 26 µm, or from about 18 µm to about 26 µm, or from about 19 µm to about 26 µm, or from about 20 µm to about 26 µm, or from about 21 µm to about 26 µm, or from about 22 µm to about 26 µm, or from about 23 µm to about 26 µm, or from about 24 µm to about 26 µm, or from about 25 µm to about 26 µm, or from about 1 µm to about 25 µm, or from about 2 µm to about 25 µm, or from about 3 µm to about 25 µm, or from about 4 µm to about 25 µm, or from about 5 µm to about 25 µm, or from about 6 µm to about 25 µm, or from about 7 µm to about 25 µm, or from about 8 µm to about 25 µm, or from about 9 µm to about 25 µm, or from about 10 µm to about 25 µm, or from about 11 µm to about 25 µm, or from about 12 µm to about 25 µm, or from about 13 µm to about 25 µm, or from about 14 µm to about 25 µm, or from about 15 µm to about 25 µm, or from about 16 µm to about 25 µm, or from about 17 µm to about 25 µm, or from about 18 µm to about 25 µm, or from about 19 µm to about 25 µm, or from about 20 µm to about 25 µm, or from about 21 µm to about 25 µm, or from about 22 µm to about 25 µm, or from about 23 µm to about 25 µm, or from about 24 µm to about 25 µm, or from about 1 µm to about 24 µm, or from about 2 µm to about 24 µm, or from about 3 µm to about 24 µm, or from about 4 µm to about 24 µm, or from about 5 µm to about 24 µm, or from about 6 µm to about 24 µm, or from about 7 µm to about 24 µm, or from about 8 µm to about 24 µm, or from about 9 µm to about 24 µm, or from about 10 µm to about 24 µm, or from about 11 µm to about 24 µm, or from about 12 µm to about 24 µm, or from about 13 µm to about 24 µm, or from about 14 µm to about 24 µm, or from about 15 µm to about 24 µm, or from about 16 µm to about 24 µm, or from about 17 µm to about 24 µm, or from about 18 µm to about 24 µm, or from about 19 µm to about 24 µm, or from about 20 µm to about 24 µm, or from about 21 µm to about 24 µm, or from about 22 µm to about 24 µm, or from about 23 µm to about 24 µm, or from about 1 µm to about 23 µm, or from about 2 µm to about 23 µm, or from about 3 µm to about 23 µm, or from about 4 µm to about 23 µm, or from about 5 µm to about 23 µm, or from about 6 µm to about 23 µm, or from about 7 µm to about 23 µm, or from about 8 µm to about 23 µm, or from about 9 µm to about 23 µm, or from about 10 µm to about 23 µm, or from about 11 µm to about 23 µm, or from about 12 µm to about 23 µm, or from about 13 µm to about 23 µm, or from about 14 µm to about 23 µm, or from about 15 µm to about 23 µm, or from about 16 µm to about 23 µm, or from about 17 µm to about 23 µm, or from about 18 µm to about 23 µm, or from about 19 µm to about 23 µm, or from about 20 µm to about 23 µm, or from about 21 µm to about 23 µm, or from about 22 µm to about 23 µm, or from about 1 µm to about 22 µm, or from about 2 µm to about 22 µm, or from about 3 µm to about 22 µm, or from about 4 µm to about 22 µm, or from about 5 µm to about 22 μm, or from about 6 μm to about 22 μm, or from about 7 μm to about 22 μm, or from about 8 μm to about 22 μm, or from about 9 μm to about 22 μm, or from about 10 μm to about 22 μm, or from about 11 μm to about 22 μm, or from about 12 μm to about 22 μm, or from about 13 μm to about 22 μm, or from about 14 μm to about 22 μm, or from about 15 μm to about 22 μm, or from about 16 μm to about 22 μm, or from about 17 μm to about 22 μm, or from about 18 μm to about 22 μm, or from about 19 μm to about 22 μm, or from about 20 μm to about 22 μm, or from about 21 μm to about 22 μm, or from about 1 μm to about 21 μm, or from about 2 μm to about 21 μm, or from about 3 μm to about 21 μm, or from about 4 μm to about 21 μm, or from about 5 μm to about 21 μm, or from about 6 μm to about 21 μm, or from about 7 μm to about 21 μm, or from about 8 μm to about 21 μm, or from about 9 μm to about 21 μm, or from about 10 μm to about 21 μm, or from about 11 μm to about 21 μm, or from about 12 μm to about 21 μm, or from about 13 μm to about 21 μm, or from about 14 μm to about 21 μm, or from about 15 μm to about 21 μm, or from about 16 μm to about 21 μm, or from about 17 μm to about 21 μm, or from about 18 μm to about 21 μm, or from about 19 μm to about 21 μm, or from about 20 μm to about 21 μm, or from about 1 μm to about 20 μm, or from about 2 μm to about 20 μm, or from about 3 μm to about 20 μm, or from about 4 μm to about 20 μm, or from about 5 μm to about 20 μm, or from about 6 μm to about 20 μm, or from about 7 μm to about 20 μm, or from about 8 μm to about 20 μm, or from about 9 μm to about 20 μm, or from about 10 μm to about 20 μm, or from about 11 μm to about 20 μm, or from about 12 μm to about 20 μm, or from about 13 μm to about 20 μm, or from about 14 μm to about 20 μm, or from about 15 μm to about 20 μm, or from about 16 μm to about 20 μm, or from about 17 μm to about 20 μm, or from about 18 μm to about 20 μm, or from about 19 μm to about 20 μm, or from about 1 μm to about 19 μm, or from about 2 μm to about 19 μm, or from about 3 μm to about 19 μm, or from about 4 μm to about 19 μm, or from about 5 μm to about 19 μm, or from about 6 μm to about 19 μm, or from about 7 μm to about 19 μm, or from about 8 μm to about 19 μm, or from about 9 μm to about 19 μm, or from about 10 μm to about 19 μm, or from about 11 μm to about 19 μm, or from about 12 μm to about 19 μm, or from about 13 μm to about 19 μm, or from about 14 μm to about 19 μm, or from about 15 μm to about 19 μm, or from about 16 μm to about 19 μm, or from about 17 μm to about 19 μm, or from about 18 μm to about 19 μm, or from about 1 μm to about 18 μm, or from about 2 μm to about 18 μm, or from about 3 μm to about 18 μm, or from about 4 μm to about 18 μm, or from about 5 μm to about 18 μm, or from about 6 μm to about 18 μm, or from about 7 μm to about 18 μm, or from about 8 μm to about 18 μm, or from about 9 μm to about 18 μm, or from about 10 μm to about 18 μm, or from about 11 μm to about 18 μm, or from about 12 μm to about 18 μm, or from about 13 μm to about 18 μm, or from about 14 μm to about 18 μm, or from about 15 μm to about 18 μm, or from about 16 μm to about 18 μm, or from about 17 μm to about 18 μm, or from about 1 μm to about 17 μm, or from about 2 μm to about 17 μm, or from about 3 μm to about 17 μm, or from about 4 μm to about 17 μm, or from about 5 μm to about 17 μm, or from about 6 μm to about 17 μm, or from about 7 μm to about 17 μm, or from about 8 μm to about 17 μm, or from about 9 μm to about 17 μm, or from about 10 μm to about 17 μm, or from about 11 μm to about 17 μm, or from about 12 μm to about 17 μm, or from about 13 μm to about 17 μm, or from about 14 μm to about 17 μm, or from about 15 μm to about 17 μm, or from about 16 μm to about 17 μm, or from about 1 μm to about 16 μm, or from about 2 μm to about 16 μm, or from about 3 μm to about 16 μm, or from about 4 μm to about 16 μm, or from about 5 μm to about 16 μm, or from about 6 μm to about 16 μm, or from about 7 μm to about 16 μm, or from about 8 μm to about 16 μm, or from about 9 μm to about 16 μm, or from about 10 μm to about 16 μm, or from about 11 μm to about 16 μm, or from about 12 μm to about 16 μm, or from about 13 μm to about 16 μm, or from about 14 μm to about 16 μm, or from about 15 μm to about 16 μm, or from about 1 μm to about 15 μm, or from about 2 μm to about 15 μm, or from about 3 μm to about 15 μm, or from about 4 μm to about 15 μm, or from about 5 μm to about 15 μm, or from about 6 μm to about 15 μm, or from about 7 μm to about 15 μm, or from about 8 μm to about 15 μm, or from about 9 μm to about 15 μm, or from about 10 μm to about 15 μm, or from about 11 μm to about 15 μm, or from about 12 μm to about 15 μm, or from about 13 μm to about 15 μm, or from about 14 μm to about 15 μm, or from about 1 μm to about 14 μm, or from about 2 μm to about 14 μm, or from about 3 μm to about 14 μm, or from about 4 μm to about 14 μm, or from about 5 μm to about 14 μm, or from about 6 μm to about 14 μm, or from about 7 μm to about 14 μm, or from about 8 μm to about 14 μm, or from about 9 μm to about 14 μm, or from about 10 μm to about 14 μm, or from about 11 μm to about 14 μm, or from about 12 μm to about 14 μm, or from about 13 μm to about 14 μm, or from about 1 μm to about 13 μm, or from about 2 μm to about 13 μm, or from about 3 μm to about 13 μm, or from about 4 μm to about 13 μm, or from about 5 μm to about 13 μm, or from about 6 μm to about 13 μm, or from about 7 μm to about 13 μm, or from about 8 μm to about 13 μm, or from about 9 μm to about 13 μm, or from about 10 μm to about 13 μm, or from about 11 μm to about 13 μm, or from about 12 μm to about 13 μm, or from about 1 μm to about 12 μm, or from about 2 μm to about 12 μm, or from about 3 μm to about 12 μm, or from about 4 μm to about 12 μm, or from about 5 μm to about 12 μm, or from about 6 μm to about 12 μm, or from about 7 μm to about 12 μm, or from about 8 μm to about 12 μm, or from about 9 μm to about 12 μm, or from about 10 μm to about 12 μm, or from about 11 μm to about 12 μm, or from about 1 μm to about 11 μm, or from about 2 μm to about 11 μm, or from about 3 μm to about 11 μm, or from about 4 μm to about 11 μm, or from about 5 μm to about 11 μm, or from about 6 μm to about 11 μm, or from about 7 μm to about 11 μm, or from about 8 μm to about 11 μm, or from about 9 μm to about 11 μm, or from about 10 μm to about 11 μm, or from about 1 μm to about 10 μm, or from about 2 μm to about 10 μm, or from about 3 μm to about 10 μm, or from about 4 μm to about 10 μm, or from about 5 μm to about 10 μm, or from about 6 μm to about 10 μm, or from about 7 μm to about 10 μm, or from about 8 μm to about 10 μm, or from about 9 μm to about 10 μm, or from about 1 μm to about 9 μm, or from about 2 μm to about 9 μm, or from about 3 μm to about 9 μm, or from about 4 μm to about 9 μm, or from about 5 μm to about 9 μm, or from about 6 μm to about 9 μm, or from about 7 μm to about 9 μm, or from about 8 μm to about 9 μm, or from about 1 μm to about 8 μm, or from about 2 μm to about 8 μm, or from about 3 μm to about 8 μm, or from about 4 μm to about 8 μm, or from about 5 μm to about 8 μm, or from about 6 μm to about 8 μm, or from about 7 μm to about 8 μm, or from about 1 μm to about 7 μm, or from about 2 μm to about 7 μm, or from about 3 μm to about 7 μm, or from about 4 μm to about 7 μm, or from about 5 μm to about 7 μm, or from about 6 μm to about 7 μm, or from about 1 μm to about 6 μm, or from about 2 μm to about 6 μm, or from about 3 μm to about 6 μm, or from about 4 μm to about 6 μm, or from about 5 μm to about 6 μm, or from about 1 μm to about 5 μm, or from about 2 μm to about 5 μm, or from about 3 μm to about 5 μm, or from about 4 μm to about 5 μm, or from about 1 μm to about 4 μm, or from about 2 μm to about 4 μm, or from about 3 μm to about 4 μm, or from about 1 μm to about 3 μm, or from about 2 μm to about 3 μm, or about 1 μm to about 2 μm, or 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 45, 50, 55, 60, 65, 70, 75, 80, 85, 90, 95, 100, 110, 120, 130, 140, 150, 160, 170, 180, 190, 200 μm.

In embodiments, the average diameter of particles and particle size distribution only provide information about the actual size of a particle, but does not provide information the average surface or the average volume of the particle. In embodiments, measures such as the Surface area moment mean (aka. the surface weighted mean (SWN) or the Sauter mean diameter-D[3,2]) and the Volume or Mass moment mean (aka the volume weighted mean (VWM) or the De Brouckere mean diameter-D[4,3] are useful calculations to provide information about the particles of the present invention.

Therefore, in embodiments, the Surface area moment mean (aka the surface weighted mean) of the particles of the present invention may be from about 2 μm to about 30 μm, or from about 3 μm to about 30, or from about 4 μm to about 30, or from about 5 μm to about 30, or from about 6 μm to about 30, or from about 7 μm to about 30, or from about 8 μm to about 30, or from about 9 μm to about 30, or from about 10 μm to about 30, or from about 11 μm to about 30, or from about 12 μm to about 30, or from about 13 μm to about 30, or from about 14 μm to about 30, or from about 15 μm to about 30, or from about 16 μm to about 30, or from about 17 μm to about 30, or from about 18 μm to about 30, or from about 19 μm to about 30, or from about 20 μm to about 30, or from about 21 μm to about 30, or from about 22 μm to about 30, or from about 23 μm to about 30, or from about 24 μm to about 30, or from about 25 μm to about 30, or from about 26 μm to about 30, or from about 27 μm to about 30, or from about 28 μm to about 30, or from about 29 μm to about 30 μm, or 2 μm to about 29 μm, or from about 3 μm to about 29, or from about 4 μm to about 29, or from about 5 μm to about 29, or from about 6 μm to about 29, or from about 7 μm to about 29, or from about 8 μm to about 29, or from about 9 μm to about 29, or from about 10 μm to about 29, or from about 11 μm to about 29, or from about 12 μm to about 29, or from about 13 μm to about 29, or from about 14 μm to about 29, or from about 15 μm to about 29, or from about 16 μm to about 29, or from about 17 μm to about 29, or from about 18 μm to about 29, or from about 19 μm to about 29, or from about 20 μm to about 29, or from about 21 μm to about 29, or from about 22 μm to about 29, or from about 23 μm to about 29, or from about 24 μm to about 29, or from about 25 μm to about 29, or from about 26 μm to about 29, or from about 27 μm to about 29, or from about 28 μm to about 29 μm, or 2 μm to about 28 μm, or from about 3 μm to about 28, or from about 4 μm to about 28, or from about 5 μm to about 28, or from about 6 μm to about 28, or from about 7 μm to about 28, or from about 8 μm to about 28, or from about 9 μm to about 28, or from about 10 μm to about 28, or from about 11 μm to about 28, or from about 12 μm to about 28, or from about 13 μm to about 28, or from about 14 μm to about 28, or from about 15 μm to about 28, or from about 16 μm to about 28, or from about 17 μm to about 28, or from about 18 μm to about 28, or from about 19 μm to about 28, or from about 20 μm to about 28, or from about 21 μm to about 28, or from about 22 μm to about 28, or from about 23 μm to about 28, or from about 24 μm to about 28, or from about 25 μm to about 28, or from about 26 μm to about 28, or from about 27 μm to about 28, or 2 μm to about 27 μm, or from about 3 μm to about 27, or from about 4 μm to about 27, or from about 5 μm to about 27, or from about 6 μm to about 27, or from about 7 μm to about 27, or from about 8 μm to about 27, or from about 9 μm to about 27, or from about 10 μm to about 27, or from about 11 μm to about 27, or from about 12 μm to about 27, or from about 13 μm to about 27, or from about 14 μm to about 27, or from about 15 μm to about 27, or from about 16 μm to about 27, or from about 17 μm to about 27, or from about 18 μm to about 27, or from about 19 μm to about 27, or from about 20 μm to about 27, or from about 21 μm to about 27, or from about 22 μm to about 27, or from about 23 μm to about 27, or from about 24 μm to about 27, or from about 25 μm to about 27, or from about 26 μm to about 27, or 2 μm to about 26 μm, or from about 3 μm to about 26, or from about 4 μm to about 26, or from about 5 μm to about 26, or from about 6 μm to about 26, or from about 7 μm to about 26, or from about 8 μm to about 26, or from about 9 μm to about 26, or from about 10 μm to about 26, or from about 11 μm to about 26, or from about 12 μm to about 26, or from about 13 μm to about 26, or from about 14 μm to about 26, or from about 15 μm to about 26, or from about 16 μm to about 26, or from about 17 μm to about 26, or from about 18 μm to about 26, or from about 19 μm to about 26, or from about 20 μm to about 26, or from about 21 μm to about 26, or from about 22 μm to about 26, or from about 23 μm to about 26, or from about 24 μm to about 26, or from about 25 μm to about 26, or 2 μm to about 25 μm, or from about 3 μm to about 25, or from about 4 μm to about 25, or from about 5 μm to about 25, or from about 6 μm to about 25, or from about 7 μm to about 25, or from about 8 μm to about 25, or from about 9 μm to about 25, or from about 10 μm to about 25, or from about 11 μm to about 25, or from about 12 μm to about 25, or from about 13 μm to about 25, or from about 14 μm to about 25, or from about 15 μm to about 25, or from about 16 μm to about 25, or from about 17 μm to about 25, or from about 18 μm to about 25, or from about 19 μm to about 25, or from about 20 μm to about 25, or from about 21 μm to about 25, or from about 22 μm to about 25, or from about 23 μm to about 25, or from about 24 μm to about 25, or 2 μm to about 24 μm, or from about 3 μm to about 24, or from about 4 μm to about 24, or from about 5 μm to about 24, or from about 6 μm to about 24, or from about 7 μm to about 24, or from about 8 μm to about 24, or from about 9 μm to about 24, or from about 10 μm to about 24, or from about 11 μm to about 24, or from about 12 μm to about 24, or from about 13 μm to about 24, or from about 14 μm to about 24, or from about 15 μm to about 24, or from about 16 μm to about 24, or from about 17 μm to about 24, or from about 18 μm to about 24, or from about 19 μm to about 24, or from about 20 μm to about 24, or from about 21 μm to about 24, or from about 22 μm to about 24, or from about 23 μm to about 24, or 2 μm to about 23 μm, or from about 3 μm to about 23, or from about 4 μm to about 23, or from about 5 μm to about 23, or from about 6 μm to about 23, or from about 7 μm to about 23, or from about 8 μm to about 23, or from about 9 μm to about 23, or from about 10 μm to about 23, or from about 11 μm to about 23, or from about 12 μm to about 23, or from about 13 μm to about 23, or from about 14 μm to about 23, or from about 15 μm to about 23, or from about 16 μm to about 23, or from about 17 μm to about 23, or from about 18 μm to about 23, or from about 19 μm to about 23, or from about 20 μm to about 23, or from about 21 μm to about 23, or from about 22 μm to about 23, or 2 μm to about 22 μm, or from about 3 μm to about 22, or from about 4 μm to about 22, or from about 5 μm to about 22, or from about 6 μm to about 22, or from about 7 μm to about 22, or from about 8 μm to about 22, or from about 9 μm to about 22, or from about 10 μm to about 22, or from about 11 μm to about 22, or from about 12 μm to about 22, or from about 13 μm to about 22, or from about 14 μm to about 22, or from about 15 μm to about 22, or from about 16 μm to about 22, or from about 17 μm to about 22, or from about 18 μm to about 22, or from about 19 μm to about 22, or from about 20 μm to about 22, or from about 21 μm to about 22, or 2 μm to about 21 μm, or from about 3 μm to about 21, or from about 4 μm to about 21, or from about 5 μm to about 21, or from about 6 μm to about 21, or from about 7 μm to about 21, or from about 8 μm to about 21, or from about 9 μm to about 21, or from about 10 μm to about 21, or from about 11 μm to about 21, or from about 12 μm to about 21, or from about 13 μm to about 21, or from about 14 μm to about 21, or from about 15 μm to about 21, or from about 16 μm to about 21, or from about 17 μm to about 21, or from about 18 μm to about 21, or from about 19 μm to about 21, or from about 20 μm to about 21, or 2 μm to about 20 μm, or from about 3 μm to about 20, or from about 4 μm to about 20, or from about 5 μm to about 20, or from about 6 μm to about 20, or from about 7 μm to about 20, or from about 8 μm to about 20, or from about 9 μm to about 20, or from about 10 μm to about 20, or from about 11 μm to about 20, or from about 12 μm to about 20, or from about 13 μm to about 20, or from about 14 μm to about 20, or from about 15 μm to about 20, or from about 16 μm to about 20, or from about 17 μm to about 20, or from about 18 μm to about 20, or from about 19 μm to about 20, or 2 μm to about 19 μm, or from about 3 μm to about 19, or from about 4 μm to about 19, or from about 5 μm to about 19, or from about 6 μm to about 19, or from about 7 μm to about 19, or from about 8 μm to about 19, or from about 9 μm to about 19, or from about 10 μm to about 19, or from about 11 μm to about 19, or from about 12 μm to about 19, or from about 13 μm to about 19, or from about 14 μm to about 19, or from about 15 μm to about 19, or from about 16 μm to about 19, or from about 17 μm to about 19, or from about 18 μm to about 19, or 2 μm to about 17 μm, or from about 3 μm to about 17, or from about 4 μm to about 17, or from about 5 μm to about 17, or from about 6 μm to about 17, or from about 7 μm to about 17, or from about 8 μm to about 17, or from about 9 μm to about 17, or from about 10 μm to about 17, or from about 11 μm to about 17, or from about 12 μm to about 17, or from about 13 μm to about 17, or from about 14 μm to about 17, or from about 15 μm to about 17, or from about 16 μm to about 17, or 2 μm to about 16 μm, or from about 3 μm to about 16, or from about 4 μm to about 16, or from about 5 μm to about 16, or from about 6 μm to about 16, or from about 7 μm to about 16, or from about 8 μm to about 16, or from about 9 μm to about 16, or from about 10 μm to about 16, or from about 11 μm to about 16, or from about 12 μm to about 16, or from about 13 μm to about 16, or from about 14 μm to about 16, or from about 15 μm to about 16, or 2 μm to about 15 μm, or from about 3 μm to about 15, or from about 4 μm to about 15, or from about 5 μm to about 15, or from about 6 μm to about 15, or from about 7 μm to about 15, or from about 8 μm to about 15, or from about 9 μm to about 15, or from about 10 μm to about 15, or from about 11 μm to about 15, or from about 12 μm to about 15, or from about 13 μm to about 15, or from about 14 μm to about 15, or 2 μm to about 14 μm, or from about 3 μm to about 14, or from about 4 μm to about 14, or from about 5 μm to about 14, or from about 6 μm to about 14, or from about 7 μm to about 14, or from about 8 μm to about 14, or from about 9 μm to about 14, or from about 10 μm to about 14, or from about 11 μm to about 14, or from about 12 μm to about 14, or from about 13 μm to about 14, or 2 μm to about 13 μm, or from about 3 μm to about 13, or from about 4 μm to about 13, or from about 5 μm to about 13, or from about 6 μm to about 13, or from about 7 μm to about 13, or from about 8 μm to about 13, or from about 9 μm to about 13, or from about 10 μm to about 13, or from about 11 μm to about 13, or from about 12 μm to about 13, or 2 μm to about 12 μm, or from about 3 μm to about 12, or from about 4 μm to about 12, or from about 5 μm to about 12, or from about 6 μm to about 12, or from about 7 μm to about 12, or from about 8 μm to about 12, or from about 9 μm to about 12, or from about 10 μm to about 12, or from about 11 μm to about 12, or 2 μm to about 11 μm, or from about 3 μm to about 11, or from about 4 μm to about 11, or from about 5 μm to about 11, or from about 6 μm to about 11, or from about 7 μm to about 11, or from about 8 μm to about 11, or from about 9 μm to about 11, or from about 10 μm to about 11, or 2 μm to about 10 μm, or from about 3 μm to about 10, or from about 4 μm to about 10, or from about 5 μm to about 10, or from about 6 μm to about 10, or from about 7 μm to about 10, or from about 8 μm to about 10, or from about 9 μm to about 10, or 2 μm to about 9 μm, or from about 3 μm to about 9, or from about 4 μm to about 9, or from about 5 μm to about 9, or from about 6 μm to about 9, or from about 7 μm to about 9, or from about 8 μm to about 9, or 2 μm to about 8 μm, or from about 3 μm to about 8, or from about 4 μm to about 8, or from about 5 μm to about 8, or from about 6 μm to about 8, or from about 7 μm to about 8, or 2 μm to about 7 μm, or from about 3 μm to about 7, or from about 4 μm to about 7, or from about 5 μm to about 7, or from about 6 μm to about 7, or 2 μm to about 6 μm, or from about 3 μm to about 6, or from about 4 μm to about 6, or from about 5 μm to about 6, or 2 μm to about 5 μm, or from about 3 μm to about 5, or from about 4 μm to about 5, or 2 μm to about 4 μm, or from about 3 μm to about 4, or 2 μm to about 4 μm, or 2, 3, 4, 5, 6, 7, 8, 9, 10, 11, 12, 13, 14, 15, 16, 17, 18, 19, 20, 21, 22, 23, 24, 25, 26, 27, 28, 29, 30 μm.

Therefore, in embodiments, the Volume or Mass moment mean (aka the volume weighted mean) of the particles of the present invention may be from about 2 μm to about 30 μm, or from about 3 μm to about 30, or from about 4 μm to about 30, or from about 5 μm to about 30, or from about 6 μm to about 30, or from about 7 μm to about 30, or from about 8 μm to about 30, or from about 9 μm to about 30, or from about 10 μm to about 30, or from about 11 μm to about 30, or from about 12 μm to about 30, or from about 13 μm to about 30, or from about 14 μm to about 30, or from about 15 μm to about 30, or from about 16 μm to about 30, or from about 17 μm to about 30, or from about 18 μm to about 30, or from about 19 μm to about 30, or from about 20 μm to about 30, or from about 21 μm to about 30, or from about 22 μm to about 30, or from about 23 μm to about 30, or from about 24 μm to about 30, or from about 25 μm to about 30, or from about 26 μm to about 30, or from about 27 μm to about 30, or from about 28 μm to about 30, or from about 29 μm to about 30 μm, or 2 μm to about 29 μm, or from about 3 μm to about 29, or from about 4 μm to about 29, or from about 5 μm to about 29, or from about 6 μm to about 29, or from about 7 μm to about 29, or from about 8 μm to about 29, or from about 9 μm to about 29, or from about 10 μm to about 29, or from about 11 μm to about 29, or from about 12 μm to about 29, or from about 13 μm to about 29, or from about 14 μm to about 29, or from about 15 μm to about 29, or from about 16 μm to about 29, or from about 17 μm to about 29, or from about 18 μm to about 29, or from about 19

μm to about 29, or from about 20 μm to about 29, or from about 21 μm to about 29, or from about 22 μm to about 29, or from about 23 μm to about 29, or from about 24 μm to about 29, or from about 25 μm to about 29, or from about 26 μm to about 29, or from about 27 μm to about 29, or from about 28 μm to about 29 μm, or 2 μm to about 28 μm, or from about 3 μm to about 28, or from about 4 μm to about 28, or from about 5 μm to about 28, or from about 6 μm to about 28, or from about 7 μm to about 28, or from about 8 μm to about 28, or from about 9 μm to about 28, or from about 10 μm to about 28, or from about 11 μm to about 28, or from about 12 μm to about 28, or from about 13 μm to about 28, or from about 14 μm to about 28, or from about 15 μm to about 28, or from about 16 μm to about 28, or from about 17 μm to about 28, or from about 18 μm to about 28, or from about 19 μm to about 28, or from about 20 μm to about 28, or from about 21 μm to about 28, or from about 22 μm to about 28, or from about 23 μm to about 28, or from about 24 μm to about 28, or from about 25 μm to about 28, or from about 26 μm to about 28, or from about 27 μm to about 28, or 2 μm to about 27 μm, or from about 3 μm to about 27, or from about 4 μm to about 27, or from about 5 μm to about 27, or from about 6 μm to about 27, or from about 7 μm to about 27, or from about 8 μm to about 27, or from about 9 μm to about 27, or from about 10 μm to about 27, or from about 11 μm to about 27, or from about 12 μm to about 27, or from about 13 μm to about 27, or from about 14 μm to about 27, or from about 15 μm to about 27, or from about 16 μm to about 27, or from about 17 μm to about 27, or from about 18 μm to about 27, or from about 19 μm to about 27, or from about 20 μm to about 27, or from about 21 μm to about 27, or from about 22 μm to about 27, or from about 23 μm to about 27, or from about 24 μm to about 27, or from about 25 μm to about 27, or from about 26 μm to about 27, or 2 μm to about 26 μm, or from about 3 μm to about 26, or from about 4 μm to about 26, or from about 5 μm to about 26, or from about 6 μm to about 26, or from about 7 μm to about 26, or from about 8 μm to about 26, or from about 9 μm to about 26, or from about 10 μm to about 26, or from about 11 μm to about 26, or from about 12 μm to about 26, or from about 13 μm to about 26, or from about 14 μm to about 26, or from about 15 μm to about 26, or from about 16 μm to about 26, or from about 17 μm to about 26, or from about 18 μm to about 26, or from about 19 μm to about 26, or from about 20 μm to about 26, or from about 21 μm to about 26, or from about 22 μm to about 26, or from about 23 μm to about 26, or from about 24 μm to about 26, or from about 25 μm to about 26, or 2 μm to about 25 μm, or from about 3 μm to about 25, or from about 4 μm to about 25, or from about 5 μm to about 25, or from about 6 μm to about 25, or from about 7 μm to about 25, or from about 8 μm to about 25, or from about 9 μm to about 25, or from about 10 μm to about 25, or from about 11 μm to about 25, or from about 12 μm to about 25, or from about 13 μm to about 25, or from about 14 μm to about 25, or from about 15 μm to about 25, or from about 16 μm to about 25, or from about 17 μm to about 25, or from about 18 μm to about 25, or from about 19 μm to about 25, or from about 20 μm to about 25, or from about 21 μm to about 25, or from about 22 μm to about 25, or from about 23 μm to about 25, or from about 24 μm to about 25, or 2 μm to about 24 μm, or from about 3 μm to about 24, or from about 4 μm to about 24, or from about 5 μm to about 24, or from about 6 μm to about 24, or from about 7 μm to about 24, or from about 8 μm to about 24, or from about 9 μm to about 24, or from about 10 μm to about 24, or from about 11 μm to about 24, or from about 12 μm to about 24, or from about 13 μm to about 24, or from about 14 μm to about 24, or from about 15 μm to about 24, or from about 16 μm to about 24, or from about 17 μm to about 24, or from about 18 μm to about 24, or from about 19 μm to about 24, or from about 20 μm to about 24, or from about 21 μm to about 24, or from about 22 μm to about 24, or from about 23 μm to about 24, or 2 μm to about 23 μm, or from about 3 μm to about 23, or from about 4 μm to about 23, or from about 5 μm to about 23, or from about 6 μm to about 23, or from about 7 μm to about 23, or from about 8 μm to about 23, or from about 9 μm to about 23, or from about 10 μm to about 23, or from about 11 μm to about 23, or from about 12 μm to about 23, or from about 13 μm to about 23, or from about 14 μm to about 23, or from about 15 μm to about 23, or from about 16 μm to about 23, or from about 17 μm to about 23, or from about 18 μm to about 23, or from about 19 μm to about 23, or from about 20 μm to about 23, or from about 21 μm to about 23, or from about 22 μm to about 23, or 2 μm to about 22 μm, or from about 3 μm to about 22, or from about 4 μm to about 22, or from about 5 μm to about 22, or from about 6 μm to about 22, or from about 7 μm to about 22, or from about 8 μm to about 22, or from about 9 μm to about 22, or from about 10 μm to about 22, or from about 11 μm to about 22, or from about 12 μm to about 22, or from about 13 μm to about 22, or from about 14 μm to about 22, or from about 15 μm to about 22, or from about 16 μm to about 22, or from about 17 μm to about 22, or from about 18 μm to about 22, or from about 19 μm to about 22, or from about 20 μm to about 22, or from about 21 μm to about 22, or 2 μm to about 21 μm, or from about 3 μm to about 21, or from about 4 μm to about 21, or from about 5 μm to about 21, or from about 6 μm to about 21, or from about 7 μm to about 21, or from about 8 μm to about 21, or from about 9 μm to about 21, or from about 10 μm to about 21, or from about 11 μm to about 21, or from about 12 μm to about 21, or from about 13 μm to about 21, or from about 14 μm to about 21, or from about 15 μm to about 21, or from about 16 μm to about 21, or from about 17 μm to about 21, or from about 18 μm to about 21, or from about 19 μm to about 21, or from about 20 μm to about 21, or 2 μm to about 20 μm, or from about 3 μm to about 20, or from about 4 μm to about 20, or from about 5 μm to about 20, or from about 6 μm to about 20, or from about 7 μm to about 20, or from about 8 μm to about 20, or from about 9 μm to about 20, or from about 10 μm to about 20, or from about 11 μm to about 20, or from about 12 μm to about 20, or from about 13 μm to about 20, or from about 14 μm to about 20, or from about 15 μm to about 20, or from about 16 μm to about 20, or from about 17 μm to about 20, or from about 18 μm to about 20, or from about 19 μm to about 20, or 2 μm to about 19 μm, or from about 3 μm to about 19, or from about 4 μm to about 19, or from about 5 μm to about 19, or from about 6 μm to about 19, or from about 7 μm to about 19, or from about 8 μm to about 19, or from about 9 μm to about 19, or from about 10 μm to about 19, or from about 11 μm to about 19, or from about 12 μm to about 19, or from about 13 μm to about 19, or from about 14 μm to about 19, or from about 15 μm to about 19, or from about 16 μm to about 19, or from about 17 μm to about 19, or from about 18 μm to about 19, or 2 μm to about 17 μm, or from about 3 μm to about 17, or from about 4 μm to about 17, or from about 5 μm to about 17, or from about 6 μm to about 17, or from about 7 μm to about 17, or from about 8 μm to about 17, or from about 9 μm to about 17, or from about 10 μm to about 17, or from about 11 μm to about 17, or from about 12 μm to about 17, or from about 13 μm to about 17, or from about 14 μm to about 17, or from about 15 μm to about 17, or from about 16 μm to about 17, or 2 μm to about 16 μm, or from about 3 μm to about 16, or from about 4 µm to about 16, or from about 5 µm to about 16, or from about 6 µm to about 16, or from about 7 µm to about 16, or from about 8 µm to about 16, or from about 9 µm to about 16, or from about 10 µm to about 16, or from about 11 µm to about 16, or from about 12 µm to about 16, or from about 13 µm to about 16, or from about 14 µm to about 16, or from about 15 µm to about 16, or 2 µm to about 15 µm, or from about 3 µm to about 15, or from about 4 µm to about 15, or from about 5 µm to about 15, or from about 6 µm to about 15, or from about 7 µm to about 15, or from about 8 µm to about 15, or from about 9 µm to about 15, or from about 10 µm to about 15, or from about 11 µm to about 15, or from about 12 µm to about 15, or from about 13 µm to about 15, or from about 14 µm to about 15, or 2 µm to about 14 µm, or from about 3 µm to about 14, or from about 4 µm to about 14, or from about 5 µm to about 14, or from about 6 µm to about 14, or from about 7 µm to about 14, or from about 8 µm to about 14, or from about 9 µm to about 14, or from about 10 µm to about 14, or from about 11 µm to about 14, or from about 12 µm to about 14, or from about 13 µm to about 14, or 2 µm to about 13 µm, or from about 3 µm to about 13, or from about 4 µm to about 13, or from about 5 µm to about 13, or from about 6 µm to about 13, or from about 7 µm to about 13, or from about 8 µm to about 13, or from about 9 µm to about 13, or from about 10 µm to about 13, or from about 11 µm to about 13, or from about 12 µm to about 13, or 2 µm to about 12 µm, or from about 3 µm to about 12, or from about 4 µm to about 12, or from about 5 µm to about 12, or from about 6 µm to about 12, or from about 7 µm to about 12, or from about 8 µm to about 12, or from about 9 µm to about 12, or from about 10 µm to about 12, or from about 11 µm to about 12, or 2 µm to about 11 µm, or from about 3 µm to about 11, or from about 4 µm to about 11, or from about 5 µm to about 11, or from about 6 µm to about 11, or from about 7 µm to about 11, or from about 8 µm to about 11, or from about 9 µm to about 11, or from about 10 µm to about 11, or 2 µm to about 10 µm, or from about 3 µm to about 10, or from about 4 µm to about 10, or from about 5 µm to about 10, or from about 6 µm to about 10, or from about 7 µm to about 10, or from about 8 µm to about 10, or from about 9 µm to about 10, or 2 µm to about 9 µm, or from about 3 µm to about 9, or from about 4 µm to about 9, or from about 5 µm to about 9, or from about 6 µm to about 9, or from about 7 µm to about 9, or from about 8 µm to about 9, or 2 µm to about 8 µm, or from about 3 µm to about 8, or from about 4 µm to about 8, or from about 5 µm to about 8, or from about 6 µm to about 8, or from about 7 µm to about 8, or 2 µm to about 7 µm, or from about 3 µm to about 7, or from about 4 µm to about 7, or from about 5 µm to about 7, or from about 6 µm to about 7, or 2 µm to about 6 µm, or from about 3 µm to about 6, or from about 4 µm to about 6, or from about 5 µm to about 6, or 2 µm to about 5 µm, or from about 3 µm to about 5, or from about 4 µm to about 5, or 2 µm to about 4 µm, or from about 3 µm to about 4, or 2 µm to about 4 µm, or 2, 3, 4, 5, 6, 7, 8, 9, 10, 11, 12, 13, 14, 15, 16, 17, 18, 19, 20, 21, 22, 23, 24, 25, 26, 27, 28, 29, 30 µm.

The terms "tempered", "tempering" are intended to mean setting the water to a given temperature suitable for the preparation of the sulfur particles according to the method of the present invention. There is a correlation between the temperature of the water and the size of the resulting sulfur particles obtained. As the temperature increases, the particles size decreases. An operable temperature range is between 15° C. and 98° C. It is important, however, that the water not be brought to boiling. In most instances the preparation of the water will require heating in order to obtain the particle size desired. A temperature range of interest is from about 45° C. to about 65° C., or from about, or from about 46° C. to about 65° C., or from about 47° C. to about 65° C., or from about 48° C. to about 65° C., or from about 49° C. to about 65° C., or from about 50° C. to about 65° C., or from about 51° C. to about 65° C., or from about 52° C. to about 65° C., or from about 53° C. to about 65° C., or from about 54° C. to about 65° C., or from about 55° C. to about 65° C., or from about 56° C. to about 65° C., or from about 57° C. to about 65° C., or from about 58° C. to about 65° C., or from about 59° C. to about 65° C., or from about 60° C. to about 65° C., or from about 61° C. to about 65° C., or from about 62° C. to about 65° C., or from about 63° C. to about 65° C., or from about 64° C. to about 65° C., or about 45° C. to about 64° C., or from about, or from about 46° C. to about 64° C., or from about 47° C. to about 64° C., or from about 48° C. to about 64° C., or from about 49° C. to about 64° C., or from about 50° C. to about 64° C., or from about 51° C. to about 64° C., or from about 52° C. to about 64° C., or from about 53° C. to about 64° C., or from about 54° C. to about 64° C., or from about 55° C. to about 64° C., or from about 56° C. to about 64° C., or from about 57° C. to about 64° C., or from about 58° C. to about 64° C., or from about 59° C. to about 64° C., or from about 60° C. to about 64° C., or from about 61° C. to about 64° C., or from about 62° C. to about 64° C., or from about 63° C. to about 64° C., or about 45° C. to about 63° C., or from about, or from about 46° C. to about 63° C., or from about 47° C. to about 63° C., or from about 48° C. to about 63° C., or from about 49° C. to about 63° C., or from about 50° C. to about 63° C., or from about 51° C. to about 63° C., or from about 52° C. to about 63° C., or from about 53° C. to about 63° C., or from about 54° C. to about 63° C., or from about 55° C. to about 63° C., or from about 56° C. to about 63° C., or from about 57° C. to about 63° C., or from about 58° C. to about 63° C., or from about 59° C. to about 63° C., or from about 60° C. to about 63° C., or from about 61° C. to about 63° C., or from about 62° C. to about 63° C., or about 45° C. to about 62° C., or from about, or from about 46° C. to about 62° C., or from about 47° C. to about 62° C., or from about 48° C. to about 62° C., or from about 49° C. to about 62° C., or from about 50° C. to about 62° C., or from about 51° C. to about 62° C., or from about 52° C. to about 62° C., or from about 53° C. to about 62° C., or from about 54° C. to about 62° C., or from about 55° C. to about 62° C., or from about 56° C. to about 62° C., or from about 57° C. to about 62° C., or from about 58° C. to about 62° C., or from about 59° C. to about 62° C., or from about 60° C. to about 62° C., or from about 61° C. to about 62° C., or about 45° C. to about 61° C., or from about, or from about 46° C. to about 61° C., or from about 47° C. to about 61° C., or from about 48° C. to about 61° C., or from about 49° C. to about 61° C., or from about 50° C. to about 61° C., or from about 51° C. to about 61° C., or from about 52° C. to about 61° C., or from about 53° C. to about 61° C., or from about 54° C. to about 61° C., or from about 55° C. to about 61° C., or from about 56° C. to about 61° C., or from about 57° C. to about 61° C., or from about 58° C. to about 61° C., or from about 59° C. to about 61° C., or from about 60° C. to about 61° C., or about 45° C. to about 60° C., or from about, or from about 46° C. to about 60° C., or from about 47° C. to about 60° C., or from about 48° C. to about 60° C., or from about 49° C. to about 60° C., or from about 50° C. to about 60° C., or from about 51° C. to about 60° C., or from about 52° C. to about 60° C., or from about 53° C. to about 60° C., or from about 54° C. to about 60° C., or from about 55° C. to about 60° C., or from about 56° C. to about 60° C., or from about 57° C. to about 60° C., or from about 58° C. to about 60° C., or from about 59° C. to about 60° C., or about 45° C. to about 59° C., or from about, or from about 46° C. to about 59° C., or from about 47° C. to about 59° C., or from about 48° C. to about 59° C., or from about 49° C. to about 59° C., or from about 50° C. to about 59° C., or from about 51° C. to about 59° C., or from about 52° C. to about 59° C., or from about 53° C. to about 59° C., or from about 54° C. to about 59° C., or from about 55° C. to about 59° C., or from about 56° C. to about 59° C., or from about 57° C. to about 59° C., or from about 58° C. to about 59° C., or about 45° C. to about 58° C., or from about, or from about 46° C. to about 58° C., or from about 47° C. to about 58° C., or from about 48° C. to about 58° C., or from about 49° C. to about 58° C., or from about 50° C. to about 58° C., or from about 51° C. to about 58° C., or from about 52° C. to about 58° C., or from about 53° C. to about 58° C., or from about 54° C. to about 58° C., or from about 55° C. to about 58° C., or from about 56° C. to about 58° C., or from about 57° C. to about 58° C., or about 45° C. to about 57° C., or from about, or from about 46° C. to about 57° C., or from about 47° C. to about 57° C., or from about 48° C. to about 57° C., or from about 49° C. to about 57° C., or from about 50° C. to about 57° C., or from about 51° C. to about 57° C., or from about 52° C. to about 57° C., or from about 53° C. to about 57° C., or from about 54° C. to about 57° C., or from about 55° C. to about 57° C., or from about 56° C. to about 57° C., or about 45° C. to about 56° C., or from about, or from about 46° C. to about 56° C., or from about 47° C. to about 56° C., or from about 48° C. to about 56° C., or from about 49° C. to about 56° C., or from about 50° C. to about 56° C., or from about 51° C. to about 56° C., or from about 52° C. to about 56° C., or from about 53° C. to about 56° C., or from about 54° C. to about 56° C., or from about 55° C. to about 56° C., or about 45° C. to about 55° C., or from about, or from about 46° C. to about 55° C., or from about 47° C. to about 55° C., or from about 48° C. to about 55° C., or from about 49° C. to about 55° C., or from about 50° C. to about 55° C., or from about 51° C. to about 55° C., or from about 52° C. to about 55° C., or from about 53° C. to about 55° C., or from about 54° C. to about 55° C., or about 45° C. to about 54° C., or from about, or from about 46° C. to about 54° C., or from about 47° C. to about 54° C., or from about 48° C. to about 54° C., or from about 49° C. to about 54° C., or from about 50° C. to about 54° C., or from about 51° C. to about 54° C., or from about 52° C. to about 54° C., or from about 53° C. to about 54° C., or about 45° C. to about 53° C., or from about, or from about 46° C. to about 53° C., or from about 47° C. to about 53° C., or from about 48° C. to about 53° C., or from about 49° C. to about 53° C., or from about 50° C. to about 53° C., or from about 51° C. to about 53° C., or from about 52° C. to about 53° C., or about 45° C. to about 52° C., or from about, or from about 46° C. to about 52° C., or from about 47° C. to about 52° C., or from about 48° C. to about 52° C., or from about 49° C. to about 52° C., or from about 50° C. to about 52° C., or from about 51° C. to about 52° C., or about 45° C. to about 51° C., or from about, or from about 46° C. to about 51° C., or from about 47° C. to about 51° C., or from about 48° C. to about 51° C., or from about 49° C. to about 51° C., or from about 50° C. to about 51° C., or about 45° C. to about 50° C., or from about, or from about 46° C. to about 50° C., or from about 47° C. to about 50° C., or from about 48° C. to about 50° C., or from about 49° C. to about 50° C., or about 45° C. to about 49° C., or from about, or from about 46° C. to about 49° C., or from about 47° C. to about 49° C., or from about 48° C. to about 49° C., or about 45° C. to about 48° C., or from about, or from about 46° C. to about 48° C., or from about 47° C. to about 48° C., or 45° C. to about 47° C., or from about, or from about 46° C. to about 47° C., or, 45° C. to about 46° C., or 45° C., 46° C., 47° C., 48° C., 49° C., 50° C., 51° C., 52° C., 53° C., 54° C., 55° C., 56° C., 57° C., 58° C., 59° C., 60° C., 61° C., 62° C., 63° C., 64° C., or 65° C. Unexpectedly, the above temperature range of from about 45° C. to about 65° C. is important to maintain the unified and controllable particle size obtained with the process of the present invention. Another temperature range of interest is between about 65° C. and about 98° C., or about 70° C. to about 98° C., or about 75° C. to about 98° C., or about 80° C. to about 98° C., or about 85° C. to about 98° C., or about 90° C. to about 98° C., or about 94° C. to about 98° C., or about 95° C. to about 98° C., or about 96° C. to about 98° C., or about 97° C. to about 98° C. This narrower temperature range represents the maximum operating temperature that can be maintained without bringing the water to a boil.

The term "pest" is intended to mean any organism that damages crops or reduces the fertility of land can be defined as a pest. These include fungus, bacteria, virus, insects, nematodes, parasites, gastropods, arthropods, snails, slugs, vertebrates (mammal and birds), algae, etc. Chemical used to kill or repel pests are called pesticides.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

In embodiments there are disclosed a method of producing sulfur particles, comprising the step of injecting an unbroken stream of a molten sulfur under a pressure of from about 200 p.s.i to about 3000 p.s.i (3447.38 to 20684.27 kPa) into a tempered water moving at velocity, to produce an explosive dispersion of the molten sulfur into sulfur particles. According to this embodiment, the pressure is a pressure having reduced pulsation. According also to this embodiment, the injection of the unbroken stream of a molten sulfur is into the tempered water moving at velocity from a distance of about 37 mm to about 101 mm.

In embodiments, it is believed that the method of the present invention is suitable for producing multiple size micron sized sulfur particles, over a narrow range of particle size. Having a more homogenous and narrower range of particle allows a more consistent and complete conversion of the sulfur providing during the growth cycle of the crop. It is also believed to provide superior oxidation to sulfate (e.g. up to 400% faster), while allowing spraying through conventional agricultural sprayer.

Pressure

Figure 1:
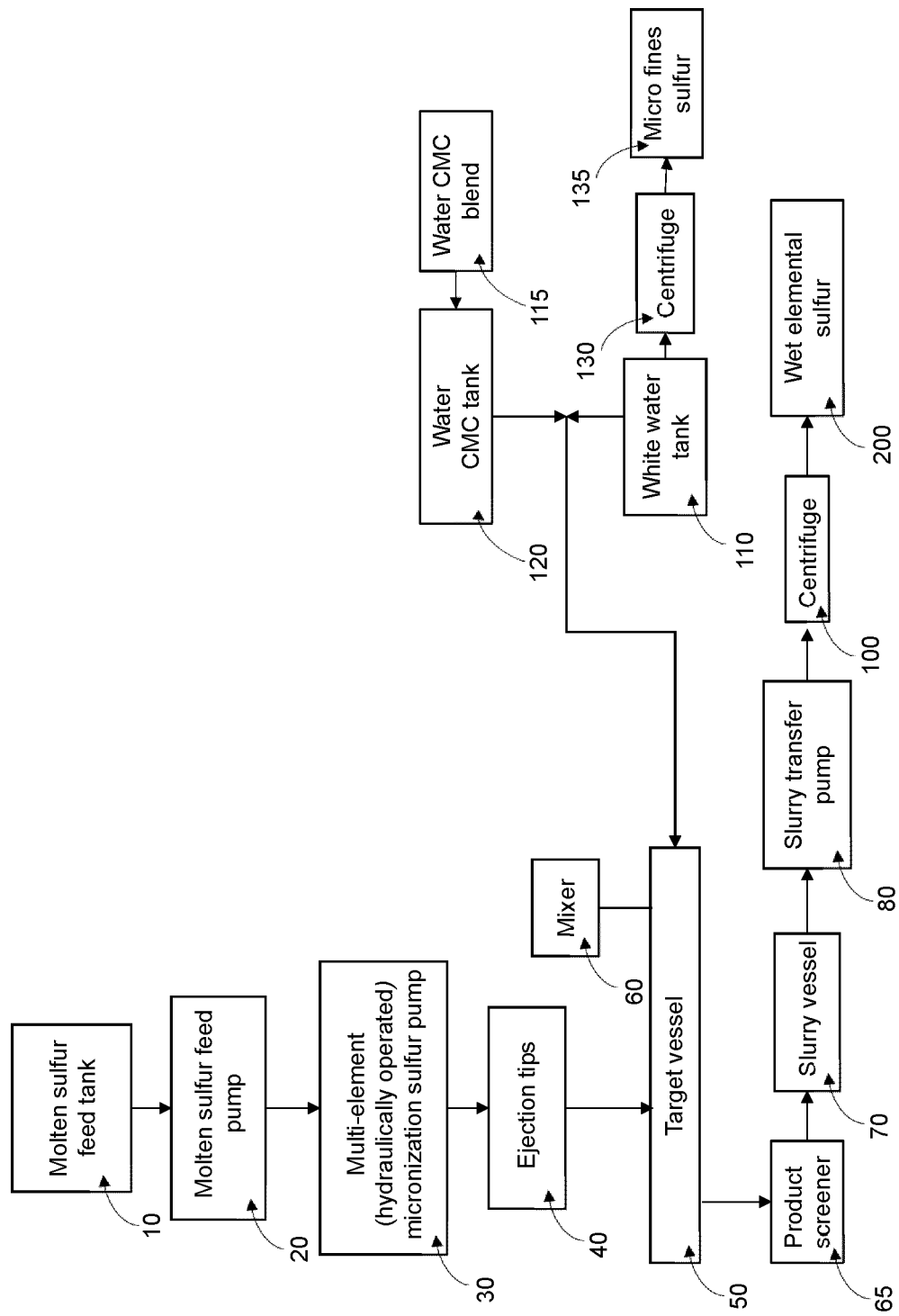
FIG. 1 illustrates a method of preparing micronized sulfur particles according to an embodiment of the present invention.

Now referring to FIG. 1, in embodiment molten sulfur from a molten sulfur feed tank 10 is pumped with a molten sulfur feed pump 20 (a low-pressure pump), into a multi-element, hydraulically operated, high pressure, micronization sulfur pump 30 which is capable of creating the unbroken stream of molten sulfur under a pressure of from about 200 p.s.i to about 3000 p.s.i (1378.95 to 20684.27 kPa). Smaller particles sizes start to be obtained at a pressure of 500 p.s.i. (3447.38 kPa). There is a correlation between the pressure and the size of particles produced by the method of the present invention. As the pressure increases the size of the particles is reduced. For this reason, pressures in the range of from about 1500 p.s.i. to about 2000 p.s.i (10342.14 kPa to about 13789.51 kPa) and closer to 2000 p.s.i. (13789.51 kPa) are preferred.

Figure 12:
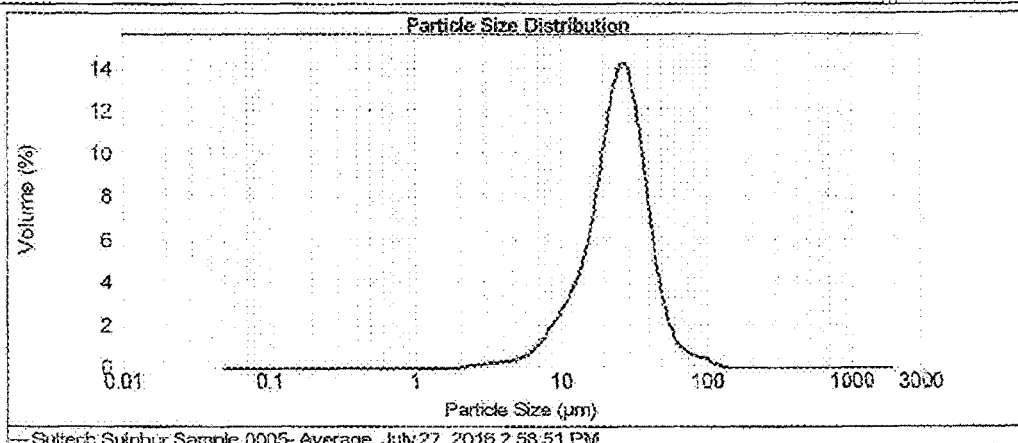
FIG. 12 illustrates a particle size distribution of sulfur particles prepared with a method with pulsation in the pressure of injection. Note the small shoulder in the size of particle near 100 μm.
Figure 13:
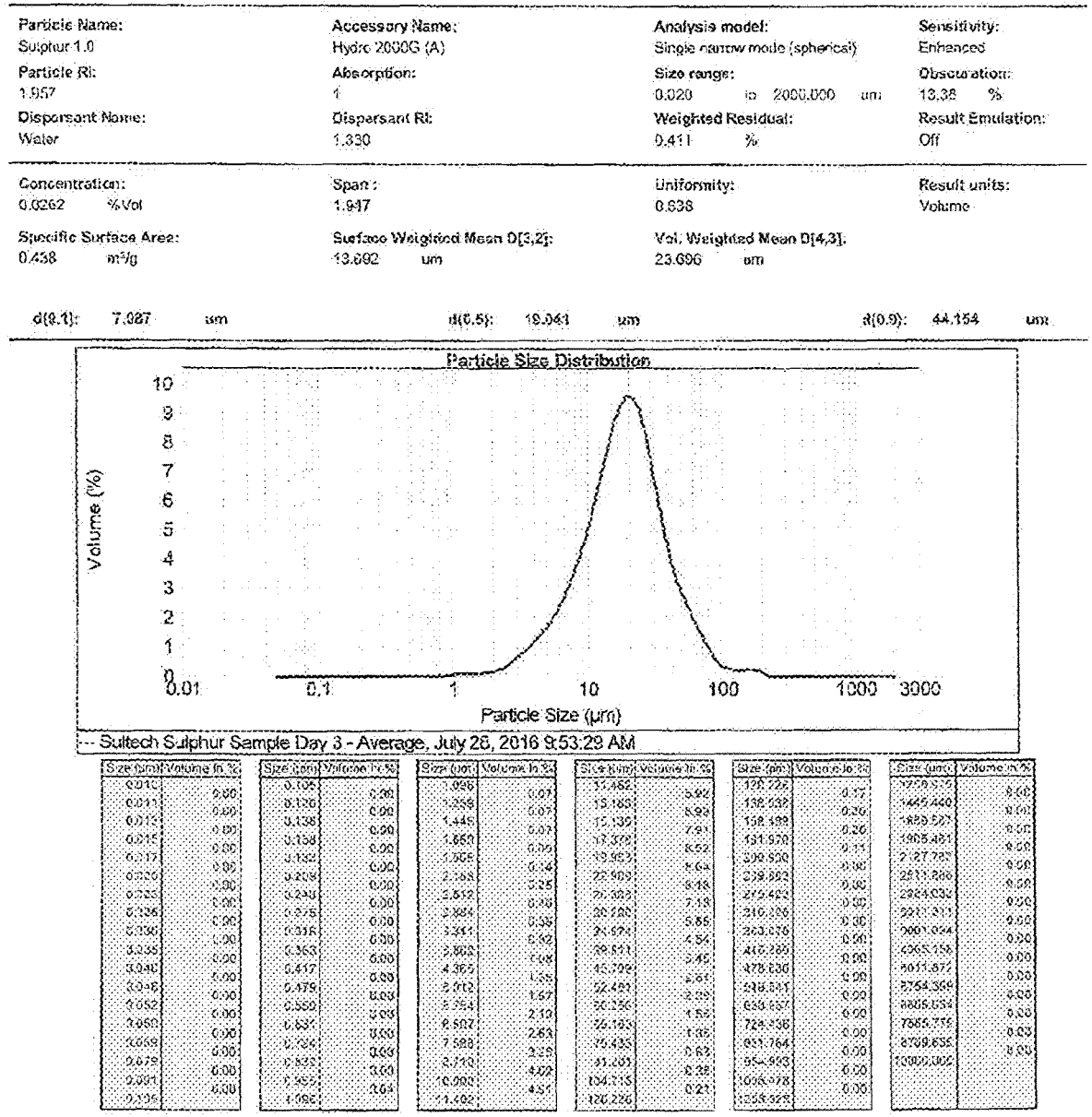
FIG. 13 illustrates a particle size distribution of sulfur particles prepared with a method with pulsation in the pressure of injection. Note the small shoulder in the size of particle slightly above 100 μm.
Figure 14:
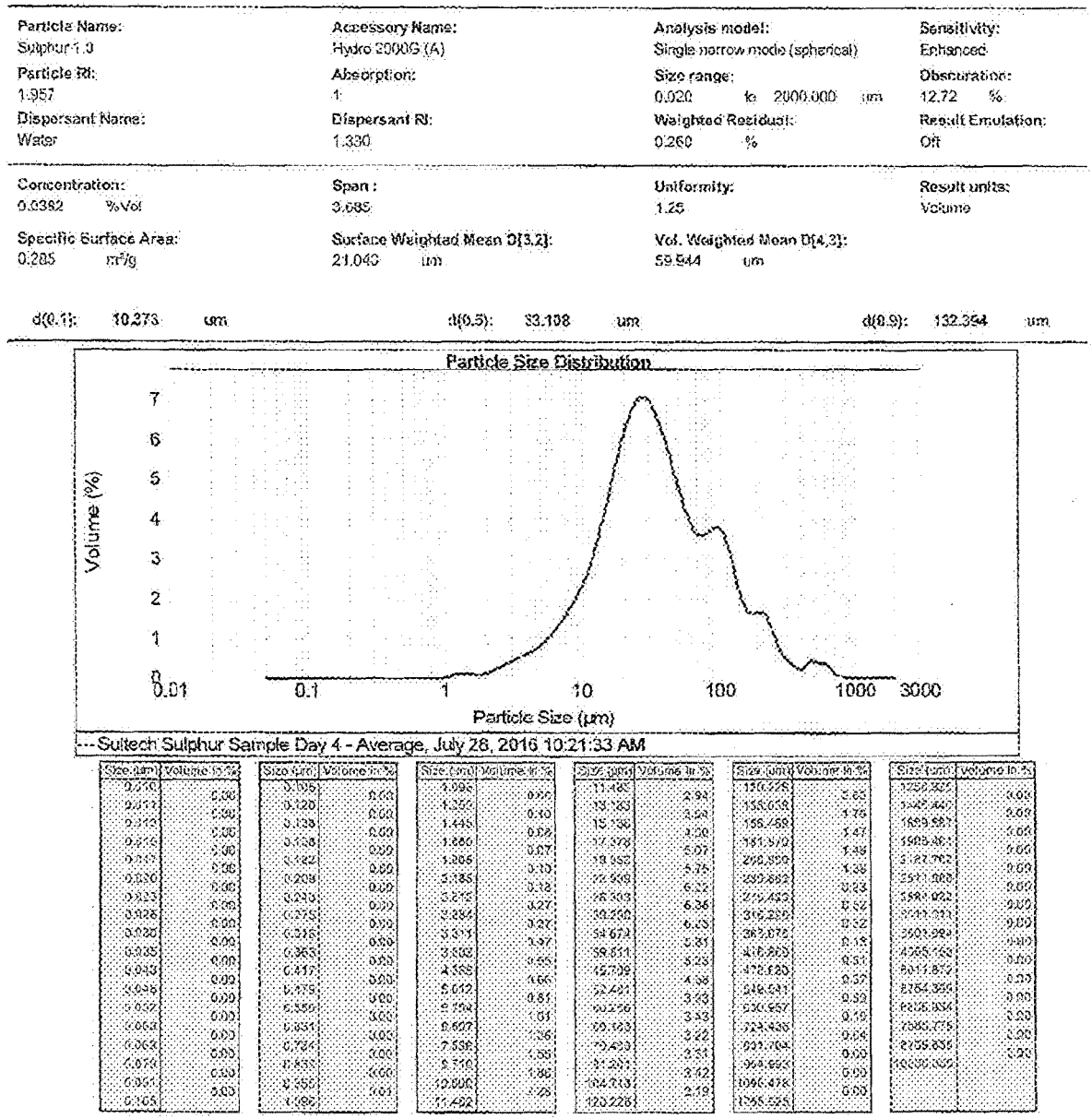
FIG. 14 illustrates a particle size distribution of sulfur particles prepared with a method with pulsation in the pressure of injection. Note the several shoulders in the size of particle starting just before 100 μm and continuing well above.
Figure 15:
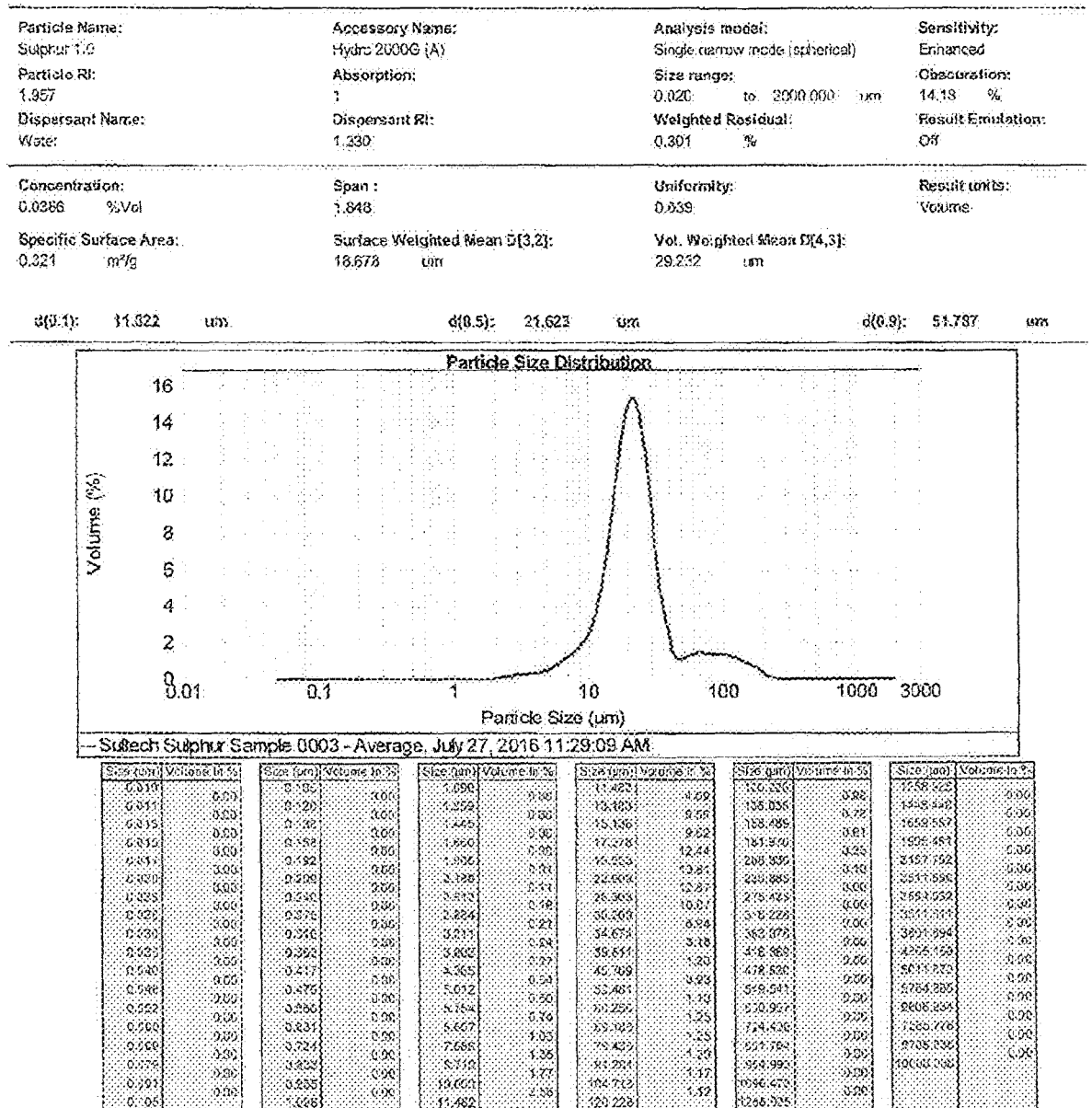
FIG. 15 illustrates a particle size distribution of sulfur particles prepared with a method with pulsation in the pressure of injection. Note the small shoulder in the size of particle near 100 μm.
Figure 16:
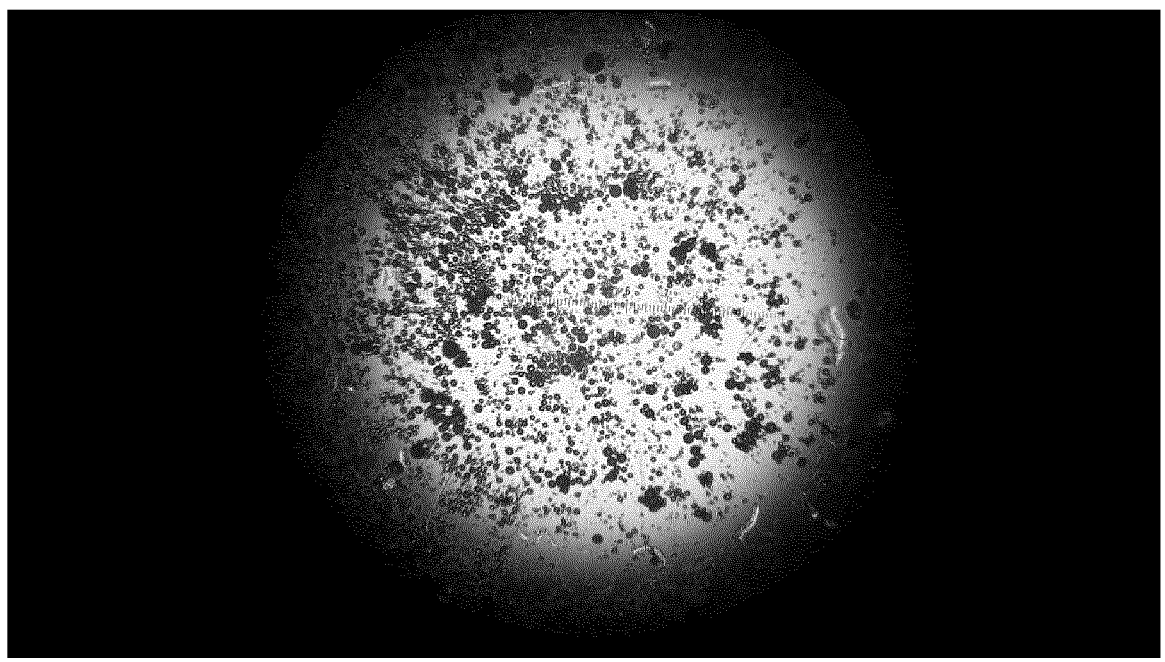
FIG. 16 is a microscope visualization of particles of sulfur particles prepared with a method with a pulsation free pressure of injection, according to the present invention. The particles are on specification.
Figure 17:
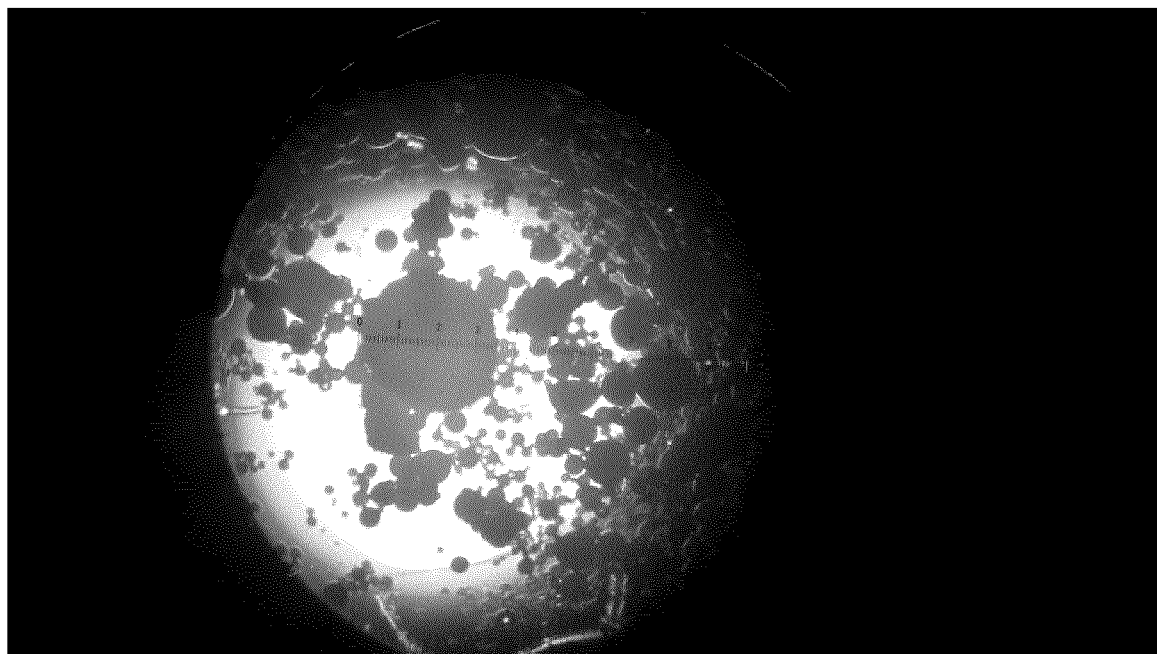
FIG. 17 is a microscope visualization of particles of sulfur particles prepared with a method with pulsating pressure of injection, producing particles that are off specification. Note the large particle of about 350 micron in the center field.

According to an embodiment, it has been found that the pressure of the unbroken stream of the molten sulfur from conventional high-pressure pumps having single or dual high pressure hydraulic cylinders is subjected to a pulsation (i.e. a cyclic variation) in the pressure, and that this pulsation during injection of the molten sulfur causes a flare in the stream of molten sulfur which in turn causes a widening of the size range of the micronized sulfur particles produced by the process. Now referring to FIGS. 11 to 15, FIG. 11 illustrates a particle size distribution of particles prepared with the process of the present invention, having a desired range of sizes, but particularly a smooth size distribution provided by the absence of pulsation in the stream of molten sulfur. FIGS. 12 to 15 show different embodiments where pulsation occurred to various degree during the preparation of the particles. FIGS. 12, 13 and 15 shows cases where the pulsation caused increasing amounts of particles toward the upper end of the distributions, as illustrated by the shoulder on the right hand side of the distributions. FIG. 14 shows an example where pulsations severely affected the size distributions and cause the formation of larger size particles up to almost 1000 μm (see the several shoulders starting near 70 μm and up to 1000 μm). Now referring to FIGS. 16 and 17, FIG. 16 shows a light microscope image of sulfur particles prepared with the process of the present invention, while FIG. 17 shows a light microscope image of sulfur particles prepared with the process in which pulsations in the pressure of the stream of molten sulfur were present, resulting in this case in the formation of large size particles, particularly particles as large as 350 μm as illustrated.

Therefore, decreasing the pulsation, or even entirely eliminating it improves the narrowness of the size range of the micronized sulfur particles produced by the method of the present invention. Therefore, according to an embodiment, the pressure of injection of the molten stream of sulfur is a pressure having reduced pulsation compared to pressures generated by conventional high-pressure pumps having single or dual high-pressure cylinders, for example. According to another embodiment, the pressure is pulsation free. According to another embodiment, the pressure may be from a pump 30 having reduced pulsations compared to a pump having a single, or a dual high-pressure hydraulic cylinders. According to an embodiment, for example, the pressure is provided with a micronization sulfur pump 30 having 3 or more hydraulic cylinders, for example, 3, 4, 5, 6 or more cylinders. The use of 3 or more cylinders in the design of the micronization sulfur pump 30 being used allows the pressure generated to be far more homogeneous and effectively minimized, and even eliminate the pulsations, such that the pressure is pulsation free.

According to another aspect of the invention, is that the absence of pulsation in the pressure also contributes to the great reduction or even the elimination of cavitation in the high pressure fluid. As used herein, cavitation is meant to mean the formation of vapour cavities in a liquid, which are small liquid-free zones ("bubbles" or "voids"), that are the consequence of forces acting upon the liquid. Cavitation usually occurs when a liquid is subjected to rapid changes of pressure that cause the formation of cavities in the liquid where the pressure is relatively low. When subjected to higher pressure, the voids implode and can generate an intense shock wave, which in turn negatively affect the continuous stream of molten sulfur that is required for preparing the sulfur particles of the present invention. Furthermore, cavitation is a significant cause of wear in some engineering contexts, as the collapsing voids that implode near to a metal surface, such as the surface of the hydraulic cylinders of the pump 30 which causes cyclic stress through repeated implosion. This results in surface fatigue of the metal causing a type of wear also called "cavitation". The most common examples of this kind of wear are to pump impellers and bends where a sudden change in the direction of liquid occurs. Cavitation is usually divided into two classes of behavior: inertial (or transient) cavitation and non-inertial cavitation.

Distance of Injection Tip

Micronization sulfur pump 30 comprises an injection tip 40, which may be varied according to the need to prepare micronized sulfur particles of a given size. The selection of the injection tip 40 plays an important role in keeping the size of the particles uniform. According to an embodiment, the injection of the unbroken stream of a molten sulfur is into the tempered water moving at velocity from a distance of about 30 to about 101 mm. It has been found that this distance is also a parameter which can be controlled in order to achieve preferred size of particles, also within a narrower range of particle size. According to embodiments, the distance may be from about 30 to about 101 mm, or from about 30 to about 100 mm, or from about 30 to about 90 mm, or from about 30 to about 80 mm, or from about 30 to about 70 mm, or from about 30 to about 76 mm, or from about 30 to about 60 mm, or from about 30 to about 50 mm, or from about 30 to about 40 mm, or from about 30 to about 35 mm, or from about 30 to about 33 mm, or from about 33 to about 101 mm, or from about 33 to about 100 mm, or from about 33 to about 90 mm, or from about 33 to about 80 mm, or from about 33 to about 70 mm, or from about 33 to about 76 mm, or from about 33 to about 60 mm, or from about 33 to about 50 mm, or from about 33 to about 40 mm, or from about 33 to about 35 mm, or from about 35 to about 101 mm, or from about 35 to about 100 mm, or from about 35 to about 90 mm, or from about 35 to about 80 mm, or from about 35 to about 70 mm, or from about 35 to about 76 mm, or from about 35 to about 60 mm, or from about 35 to about 50 mm, or from about 35 to about 40 mm, or from about 35 to about 37 mm, or from about 37 to about 101 mm, or from about 37 to about 100 mm, or from about 37 to about 90 mm, or from about 37 to about 80 mm, or from about 37 to about 70 mm, or from about 37 to about 76 mm, or from about 37 to about 60 mm, or from about 37 to about 50 mm, or from about 37 to about 40 mm, or from about 40 to about 101 mm, or from about 40 to about 100 mm, or from about 40 to about 90 mm, or from about 40 to about 80 mm, or from about 40 to about 70 mm, or from about 40 to about 76 mm, or from about 40 to about 60 mm, or from about 40 to about 50 mm, or from about 50 to about 101 mm, or from about 50 to about 100 mm, or from about 50 to about 90 mm, or from about 50 to about 80 mm, or from about 50 to about 70 mm, or from about 50 to about 76 mm, or from about 50 to about 60 mm, or from about 60 to about 101 mm, or from about 60 to about 100 mm, or from about 60 to about 90 mm, or from about 60 to about 80 mm, or from about 60 to about 70 mm, or from about 60 to about 76 mm, or from about 70 to about 101 mm, or from about 70 to about 100 mm, or from about 70 to about 90 mm, or from about 70 to about 80 mm, or from about 70 to about 76 mm, or from about 80 to about 101 mm, or from about 80 to about 100 mm, or from about 80 to about 90 mm, or from about 90 to about 101 mm, or from about 90 to about 100 mm, or about 33 mm, or about 34 mm, or about 35 mm, or about 36 mm, or about 37 mm, or about 38 mm, or about 39 mm, or about 40 mm, or about 41 mm, or about 42 mm, or about 43 mm, or about 44 mm, or about 45 mm, or about 46 mm, or about 47 mm, or about 48 mm, or about 49 mm, or about 50 mm, or about 51 mm, or about 52 mm, or about 53 mm, or about 54 mm, or about 55 mm, or about 56 mm, or about 57 mm, or about 58 mm, or about 59 mm, or about 60 mm, or about 61 mm, or about 62 mm, or about 63 mm, or about 64 mm, or about 65 mm, or about 66 mm, or about 67 mm, or about 68 mm, or about 69 mm, or about 70 mm, or about 71 mm, or about 72 mm, or about 73 mm, or about 74 mm, or about 75 mm, or about 76 mm, or about 77 mm, or about 78 mm, or about 79 mm, or about 80 mm, or about 81 mm, or about 82 mm, or about 83 mm, or about 84 mm, or about 85 mm, or about 86 mm, or about 87 mm, or about 88 mm, or about 89 mm, or about 90 mm, or about 91 mm, or about 92 mm, or about 93 mm, or about 94 mm, or about 95 mm, or about 96 mm, or about 97 mm, or about 98 mm, or about 99 mm, or about 100 mm, or about 101 mm.

The injection tip 40 may have varying discharge opening sizes, for example from about 250 μm to about 510 μm, or from about 250 μm to about 500 μm, or from about 250 μm to about 450 μm, or from about 250 μm to about 400 μm, or from about 250 μm to about 350 μm, or from about 250 μm to about 300 μm, or from about 300 μm to about 510 μm, or from about 300 μm to about 500 μm, or from about 300 μm to about 450 μm, or from about 300 μm to about 400 μm, or from about 300 μm to about 350 μm, or from about 350 μm to about 510 μm, or from about 350 μm to about 500 μm, or from about 350 μm to about 450 μm, or from about 350 μm to about 400 μm, or from about 400 μm to about 510 μm, or from about 400 μm to about 500 μm, or from about 400 μm to about 450 μm, or from about 450 μm to about 510 μm, or from about 450 μm to about 500 μm, or from about 500 μm to about 510 μm, or about 250, 275, 300, 325, 350, 375, 400, 425, 450, 475, 500, 510 μm suitable for producing sulfur particles over a range of size of interest. In embodiments, what is desired is an unbroken stream of molten sulfur, and a spray nozzle tips are not suitable for this purpose.

Molten Sulfur Temperature

Now referring to FIG. 1, in embodiments, molten sulfur may be obtained by heating sulfur in a tank (e.g. molten sulfur feed tank 10) until the sulfur becomes molten. Sulfur goes into a molten state above about 119° C. The sulfur used in the process of the present invention is also degassed, so as to prevent the presence of gas bubbles that would break the continuous stream of molten sulfur. It is preferable, however, to have the molten sulfur at low viscosity. In embodiments, in order to obtain molten sulfur with the desired low viscosity, is it preferred that the sulfur be heated to between about 140° C. and about 159° C. When the sulfur is heated to temperatures of less than about 140° C., the viscosity of the sulfur hinders the production of fine micronized particles. When the sulfur is heated to temperatures of greater than about 159° C., this results in an increase in the viscosity of the sulfur. Within the preferred temperature range of about 140° C. to about 159° C., there are narrower optimum temperature ranges of between about 150° C. and about 159° C., and about 150° C. to about 155° C. Within this narrow range the sulfur becomes molten with a minimum viscosity.

Tempered Water Temperature

Now referring to FIG. 1, according to embodiments, heating of water in target vessel 50 and inducing the movement of the water at velocity are necessary for the method of the present invention.

There is a correlation between the temperature of the water and the size of the resulting sulfur particles obtained. As the temperature increases, the particles size decreases. An operable temperature range is between about 20° C. and about 98° C. However, in any embodiments, the water should not be brought to boiling. The preparation of the water will require heating in order to obtain the particle size desired. However, the term "heating" implies that the water used would always be cooler than required, which may not be the case. Therefore, as defined above, a more precise term with respect to the preparation of the water prior to injection of the molten sulfur is "tempering", as when a larger particle size is desired the water may actually have to be cooled to maintain the temperature within the lower operating ranges. In embodiments, a temperature range of interest includes temperatures from about 45° C. to about 65° C. In other embodiments, another temperature range includes temperature between about 65° C. and about 98° C., and a narrower temperature range of between about 94° C. and about 98° C. Therefore, the temperature may be from about 45° C. to about 98° C., or from about 50° C. to about 98° C., or from about 55° C. to about 98° C., or from about 60° C. to about 98° C., or from about 65° C. to about 98° C., or from about 70° C. to about 98° C., or from about 75° C. to about 98° C., or from about 80° C. to about 98° C., or from about 85° C. to about 98° C., or from about 90° C. to about 98° C., or from about 95° C. to about 98° C., or from about 45° C. to about 95° C., or from about 50° C. to about 95° C., or from about 55° C. to about 95° C., or from about 60° C. to about 95° C., or from about 65° C. to about 95° C., or from about 70° C. to about 95° C., or from about 75° C. to about 95° C., or from about 80° C. to about 95° C., or from about 85° C. to about 95° C., or from about 90° C. to about 95° C., or from about 45° C. to about 90° C., or from about 50° C. to about 90° C., or from about 55° C. to about 90° C., or from about 60° C. to about 90° C., or from about 65° C. to about 90° C., or from about 70° C. to about 90° C., or from about 75° C. to about 90° C., or from about 80° C. to about 90° C., or from about 85° C. to about 90° C., or from about 45° C. to about 85° C., or from about 50° C. to about 85° C., or from about 55° C. to about 85° C., or from about 60° C. to about 85° C., or from about 65° C. to about 85° C., or from about 70° C. to about 85° C., or from about 75° C. to about 85° C., or from about 80° C. to about 85° C., or from about 45° C. to about 80° C., or from about 50° C. to about 80° C., or from about 55° C. to about 80° C., or from about 60° C. to about 80° C., or from about 65° C. to about 80° C., or from about 70° C. to about 80° C., or from about 75° C. to about 80° C., or from about 45° C. to about 75° C., or from about 50° C. to about 75° C., or from about 55° C. to about 75° C., or from about 60° C. to about 75° C., or from about 65° C. to about 75° C., or from about 70° C. to about 75° C., or from about 45° C. to about 70° C., or from about 50° C. to about 70° C., or from about 55° C. to about 70° C., or from about 60° C. to about 70° C., or from about 65° C. to about 70° C., or from about 45° C. to about 65° C., or from about 50° C. to about 65° C., or from about 55° C. to about 65° C., or from about 60° C. to about 65° C., or from about 45° C. to about 60° C., or from about 50° C. to about 60° C., or from about 55° C. to about 60° C., or from about 45° C. to about 55° C., or from about 50° C. to about 55° C., or from about 45° C. to about 50° C., or 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98° C.

This narrower temperature range represents the maximum operating temperature that can be maintained without bringing the water to a boil.

Surfactant

According to another embodiment, the heated water may be conditioned by the addition of a surfactant. In embodiments, the surfactant is preferably a non-foaming surfactant. In embodiments, the best results have been obtained using carboxymethyl cellulose with a low degree of substitution, for example having a degree of substitution of less than about 0.5 and, preferably, between about 0.40 and about 0.5, or between about 0.40 and about 0.45.

According to embodiments, the concentration of the surfactant may be from about 0.01 to about 1%, or about 0.02 to about 1%, or about 0.03 to about 1%, or about 0.04 to about 1%, or about 0.05 to about 1%, or about 0.1 to about 1%, or about 0.2 to about 1%, or about 0.3 to about 1%, or about 0.4 to about 1%, or about 0.5 to about 1%, or about 0.6 to about 1%, or about 0.7 to about 1%, or about 0.8 to about 1%, or about 0.9 to about 1%, or about 0.01 to about 0.9%, or about 0.02 to about 0.9%, or about 0.03 to about 0.9%, or about 0.04 to about 0.9%, or about 0.05 to about 0.9%, or about 0.1 to about 0.9%, or about 0.2 to about 0.9%, or about 0.3 to about 0.9%, or about 0.4 to about 0.9%, or about 0.5 to about 0.9%, or about 0.6 to about 0.9%, or about 0.7 to about 0.9%, or about 0.8 to about 0.9%, or about 0.01 to about 0.8%, or about 0.02 to about 0.8%, or about 0.03 to about 0.8%, or about 0.04 to about 0.8%, or about 0.05 to about 0.8%, or about 0.1 to about 0.8%, or about 0.2 to about 0.8%, or about 0.3 to about 0.8%, or about 0.4 to about 0.8%, or about 0.5 to about 0.8%, or about 0.6 to about 0.8%, or about 0.7 to about 0.8%, or about 0.01 to about 0.7%, or about 0.02 to about 0.7%, or about 0.03 to about 0.7%, or about 0.04 to about 0.7%, or about 0.05 to about 0.7%, or about 0.1 to about 0.7%, or about 0.2 to about 0.7%, or about 0.3 to about 0.7%, or about 0.4 to about 0.7%, or about 0.5 to about 0.7%, or about 0.6 to about 0.7%, or about 0.01 to about 0.6%, or about 0.02 to about 0.6%, or about 0.03 to about 0.6%, or about 0.04 to about 0.6%, or about 0.05 to about 0.6%, or about 0.1 to about 0.6%, or about 0.2 to about 0.6%, or about 0.3 to about 0.6%, or about 0.4 to about 0.6%, or about 0.5 to about 0.6%, or about 0.01 to about 0.5%, or about 0.02 to about 0.5%, or about 0.03 to about 0.5%, or about 0.04 to about 0.5%, or about 0.05 to about 0.5%, or about 0.1 to about 0.5%, or about 0.2 to about 0.5%, or about 0.3 to about 0.5%, or about 0.4 to about 0.5%, or about 0.01 to about 0.5%, or about 0.02 to about 0.5%, or about 0.03 to about 0.5%, or about 0.04 to about 0.5%, or about 0.05 to about 0.4%, or about 0.1 to about 0.4%, or about 0.2 to about 0.4%, or about 0.3 to about 0.4%, or about 0.01 to about 0.3%, or about 0.02 to about 0.3%, or about 0.03 to about 0.3%, or about 0.04 to about 0.3%, or about 0.05 to about 0.3%, or about 0.1 to about 0.3%, or about 0.2 to about 0.3%, or about 0.01 to about 0.2%, or about 0.02 to about 0.2%, or about 0.03 to about 0.2%, or about 0.04 to about 0.2%, or about 0.05 to about 0.2%, or about 0.1 to about 0.2%, or about 0.01 to about 0.1%, or about 0.02 to about 0.1%, or about 0.03 to about 0.1%, or about 0.04 to about 0.1%, or about 0.05 to about 0.1%, or about 0.01 to about 0.05%, or about 0.02 to about 0.05%, or about 0.03 to about 0.05%, or about 0.04 to about 0.05%, or about 0.01 to about 0.04%, or about 0.02 to about 0.04%, or about 0.03 to about 0.04%, or about 0.01 to about 0.03%, or about 0.02 to about 0.03%, or about 0.01 to about 0.02%, or about 0.01, 0.02, 0.03, 0.04, 0.05, 0.1, 0.2, 0.3, 0.4, 0.5, 0.6, 0.7, 0.8, 0.9, 1.0% w/w surfactant.

Velocity of Tempered Water

The movement of the water at velocity is induced by a mixer 60 in target vessel 50. The mixer 60 is capable of driving the heated water in a circular motion with sufficient angular velocity as to produce a vortex. According to an embodiment, the mixer 60 may be a vertical mixer have dual impeller. The upper impeller may be configured to induce a smooth, laminar flow across the liquid surface of the target vessel. The lower impeller, which may be included in the cone section of the target vessel may be configured to create a tight vortex of micronized sulfur slurry to assist flow and stop bridging of fines. In embodiments, the mixer 60 may be equipped with a variable frequency drive. In embodiments, the velocity of the water should be greater than 0.5 meters per second. It has been determined that this is the minimum velocity that the water must be moving in order to induce a feathering out of the sulfur stream. It should be noted, however, that the velocity of the water must increase as the concentration of fine particulate sulfur increases, in order to prevent sulfur from agglomerating. In other words, as higher concentrations of micronized sulfur particles are contained in the solution, higher velocities must be induced in the water. This increase in velocity may be provided by the variable frequency drive of the mixer 60. The motion of the target water is essential, because if the water were stagnant the sulfur would tend to agglomerate. This problem would be further exacerbated if the vessel was shallow, as the sulfur would pile up on the bottom of the target vessel and substantial agglomerations would be produced. The use of a vortex has proven to be a convenient and controllable manner of obtaining water movement of sufficient velocity, as a threshold speed well above the minimum must be obtained and maintained to sustain a vortex. In embodiments, the unbroken stream of a molten sulfur under a pressure may be injected into a periphery of the vortex. The moving of the tempered water at a velocity, for example by the mixer 60 provides a homogeneous sulfur particles and water slurry.

When the molten sulfur is injected under pressure into the tempered water, a physical reaction occurs between the molten sulfur and water blend mixture to produce fine particles. This reaction is enhanced by shear forces exerted by the vortex of tempered water moving at velocity. The fine particles are feathered out in the heated water and carried away by the vortex. The high temperature of the sulfur causes the localized water to form vapour bubbles around the fine granules, keeping them apart with the aid of the surfactant, carboxymethyl cellulose. The bubbles collapse as the sulfur is cooled by the heated water. The method results in relatively uniform spherical particles of very fine or micronized sulfur.

In embodiments, the method of the present invention may be performed until about 10% w/w solids in the water is reached, a value from which the particles are then transferred according to the steps below.

Filtration of the Sulfur Particles and Water Slurry

According to an embodiment, the method of the present invention further comprises the step of filtering the sulfur particles or the homogeneous sulfur particles and water slurry for retention of coarse sulfur particles and providing filtered sulfur particles or a filtered homogeneous sulfur particles and water slurry.

Now referring to FIG. 1, according to an embodiment the homogeneous sulfur particles and water slurry is passed through a product screener 65, which is designed to screen 100 Mesh (149 micron), to guarantee maximum particle size for spray applications. The product screener 65 may have for example a dual acting nozzle which allows the on specification product particles to screen through and be deposited into the slurry vessel 70, and subsequently into the centrifuge 100. The second Nozzle captures the product particles that are not on specification and deposits them into an off-specification slurry vessel and recycles them back into the screener until most of the on specification product is screened through. According to an embodiment, an additional white water sprayer may be used to move the product through the product screener 65. The on specification homogeneous sulfur particles are then it is transferred to a slurry vessel 70, from which the slurry is pumped by slurry pump 80, the homogeneous sulfur particles and water slurry thus obtained are then centrifuged in centrifuge 100, to provide wet elemental sulfur 200 (in particles form), and white-water, which is collected into white-water tank 110. Once centrifuged, the wet elemental sulfur 200 may have a 84% w/w solids concentration. In embodiments, the white-water may be treated to recover fine sulfur particles 135 for further processing, for example in centrifuge 130. The CMC water blend recovered from the white-water tank can be recovered, for example in water CMC tank 120, to which additional water and CMC blend 115 can be provided to top off any volume lost during the method of the present invention.

Pellets of Sulfur

According to another embodiment, the present invention also encompasses pellets of sulfur comprising the sulfur particles of the present invention in combination with a suitable carrier. In embodiments, the pellets of the present invention may comprise any desired sulfur particles according to the present invention, other nutritional elements (such as for example Nitrogen (N), Phosphorus (P), Potassium (K)), as well as suitable carriers. The carrier may include for example a pelletizing formulation which comprises sodium lignosulfate (NaLS) and bentonite clay. Each of the NaLS and bentonite clay may be present in the quantity necessary to bring the percentage of the formulation to 100%. For example, the NaLS may be present in amounts of about 2% to about 3% w/w, or from about 2.25% to about 3% w/w, or from about 2.5% to about 3% w/w, or from about 2.75% to about 3% w/w, or of about 2% to about 2.75% w/w, or from about 2.25% to about 2.75% w/w, or from about 2.5% to about 2.75% w/w, or of about 2% to about 2.5% w/w, or from about 2.25% to about 2.5% w/w, or of about 2% to about 2.25% w/w, or 2, 2.25, 2.5, 2.75, 3% w/w.

The bentonite clay may be present in amounts of about 4% to about 5% w/w, or from about 4.25% to about 5% w/w, or from about 4.5% to about 5% w/w, or from about 4.75% to about 5% w/w, or 4% to about 4.75% w/w, or from about 4.25% to about 4.75% w/w, or from about 4.5% to about 4.75% w/w, or 4% to about 4.5% w/w, or from about 4.25% to about 4.5% w/w, or 4% to about 4.25% w/w, or 4, 4.25, 4.5, 4.75, 5% w/w.

The pellets formulation may be used to make pellets having diameters from about 1 mm to about 4 mm, or from about 2 mm to about 4 mm, or from about 3 mm to about 4 mm, or from about 1 mm to about 3 mm, or from about 2 mm to about 3 mm, or from about 1 mm to about 2 mm.

The present invention will be more readily understood by referring to the following examples which are given to illustrate the invention rather than to limit its scope.

Example 1

Example Process

The sulfur is received and stored in a 120-metric tonne capacity storage tank, located inside the facility, where the temperature is maintained via maintenance steam coils. The storage tank serves as a production buffer for small disruptions in the sulfur recovery unit (SRU) production and the operation plant. The storage tank is complete with a circulating/charge pump which helps maintain homogeneous temperature (140 to 150° C.) in the tank and transfers molten sulfur through Sulfur Pre-Filters and Polishing Filter which are designed at 100 microns and steam jacketed housings with string wound filters. The pressure variation across the filter housings is measured and monitored. High pressure variation automatically switches in back up filters and notify the operators that the primary filter element requires changing. To prevent any temperature drop, a shell, and tube sulfur Heater is utilized to maintain the temperature of the molten sulfur at 148° C. through to the high-pressure injection pumps, when entering the micronizing process. To achieve sulfur particles <70 μm, the molten sulfur is injected at high pressure, between 10,342 kPag (1500 psig) to 13,790 kPag (2000 psig), through a series of injection nozzles housing into the Target Vessel 1 and 2 (Train 1) and 3 and 4 (Train 2). The target vessels contain, 60° C. water and 0.01% w/w concentration of sodium carboxymethylcellulose (NaCMC) to enhance the performance of micronization. High Pressure Feed Pumps 1 and 2 are hydraulically operated to eliminate any pulsation in the flow. It was noted during initial test trials, any pulsation in the flow will affect the sulfur particle size.

The target vessels are stainless steel tanks with 60° cone bottoms and overflow weirs on the top. The weirs maintain the level required between white water solution and injection nozzle spacing, which is critical to the effect particle size and must not be varied. Each target vessel has a dual impeller vertical mixer center mounted. The upper impeller is configured to induce a smooth, laminar flow across the liquid surface of the target vessel. The lower impeller in the cone section of the target vessel is designed to create a tight vortex of micronized sulfur slurry to assist flow and stop bridging of fines.

To replace the slurry out flow and maintain the liquid level in the target vessel, white water from white water storage tank, which is recycled water from centrifuge is pumped into the target vessel at a rate controlled by the volume feedback of the top surface weir. The recycled white water is processed through a white-water cooler and stored into white water tank, which also helps maintain the target vessel temperature below 50° C. The micronized sulfur slurry leaving the target vessel is 10% solid by weight.

During the process, the molten sulfur micronizes and solidifies; it consumes some of the CMC from the white water. To replace the correct concentration of CMC in the process, additional concentration of pre-prepared CMC is injected into the target vessel to maintain the correct concentration. The concentrated CMC is prepared in batches and stored for up to 72 hours each batch requires 60° C., batch water when adding the powdered CMC and requires 24 hours of mixing and aging before being used in the process. The batch concentration is prepared in a CMC mixing tank and transferred via CMC injection pump into CMC storage tank and transferred to target vessel via a CMC charge pump.

Micronized product from each train target vessels is controlled through the product spacer PS1/PS2, (Train 1), PS3/PS4 (Train 2), which allows the micronized product to be in homogeneous state for even dispersion into the sulfur screener SC1/SC2. (Train 1), SC3/SC4, (Train 2). The product spacer is equipped with white water nozzle as well as air nozzle which is used for blow-down purpose.

The sulfur screener, SC1 and SC2 (Train 1) and SC3 and SC4 (Train 2), are designed to screen 100 Mesh (149 micron), to guarantee maximum particle size for spray applications. For QC/QA check, any excess amounts of off-spec solids >100 μm material is recycled through an oversized slurry tank and recycle pump, per process train and is reintroduced back into the screener for further processing. Additional white water is introduced into the slurry tank which allows the product to be in an homogeneous state for consistence of flow. Due to the dewatering effect of screening equipment, the screener is equipped with wash bars over the screen to eliminate particle clumping and minimize carry over.

The on-spec <100 μm sulfur particles and water flows through the screener into a slurry tank, which also has a dual impeller vertical mixer, to keep the product in suspension and due to the dewatering properties of the screening equipment the slurry must be mixed back to a homogenous suspension with addition of white water before being transferred via a slurry transfer pump to a centrifuge, which maintains consistent solids to liquid ratios into the centrifuge in a balanced solids product.

The Centrifuge Feed Pump is controlled by two different feed backs or input sources, centrifuge back drive torque and slurry tank volume, and whichever one is greater controls the speed of the feed pump.

The final product out of the centrifuged is 16% by weight and is discharge into a Product Mixer, per process train. During the mixing process additional chemicals (e.g. optional nutritional elements (such as for example Nitrogen (N), Phosphorus (P), Potassium (K)), as well as suitable carriers, which are added to the centrifuged product for wet completion of the product of the present invention. A product transfer pump transfers the final product into product totes. Additional totes are utilized during mixing stage to allow the process to be continuous flow.

The White-Water from the centrifuge, is collected into a white water recycling tank, which contains some micronized sulfur particles in the 0 to 10 μm range and is recycled back into the process via white water recycle pump, which transfers the white water through a tube and fin cooler into a white water tank.

The white-water cooler fan speed is controlled by the discharge water temperature and the cooler will have dual inlet and discharge dampeners that will control between inside and outside air exchange to heat the building with waste heat. There will also be a heat exchange loop for drying off-spec product from the screener.

When the plant is in controlled shutdown (not emergency shutdown) the white water is transferred to the White-Water Storage Tank which is designed to hold all the white-water from the entire facility. Series of white-water transfer pumps supply white water to target vessels. White water transfer pumps are interconnected to provide flexibility to transfer white water to any target vessel during, operation, maintenance, and breakdown.

Disk Centrifuge will be utilized to remove micro fines from the white storage tank.

Example 2

Oxidation Rate of Elemental Sulfur Fertilizes Under Conditions Simulating the Prairie, Semi-Arid and Subtropical Climates Materials & Methods Sulfur-deficient soil containing 3 ppm sulfate was mixed in a screw-type soil mixer to homogenize the soil, then screened through an expanded metal grate with 22 mm×8 mm openings. The soil was then mixed with the sulfur treatment, targeting 555 mg sulfur/kg soil, in a Blakeslee & Hobart™ mixer for 10 minutes. The treatments were:

1. Sultech™ pellet (0-0-0-93),
2. Sultech™ powder (0-0-0-99),
3. Tiger™90 (0-0-0-90) and
4. Supreme™85 (0-0-0-85).

The treatments are presented using the standard designation for fertilizer, which shows the amounts (in %) of Nitrogen (N), Phosphorus (P), Potassium (K), and Sulfur (S). The remaining % is taken up by the vehicle. For example, the vehicle for the pellets of the present invention represent 7%, and is made from a mixture of sodium lignosulfate (NaLS)—about 2 to 3% w/w and bentonite clay—about 4 to 5% w/w. The wet sulfur from the centrifuge was blended with the desired amount of NaLS and after it becomes homogeneous the desired amount of bentonite clay is added. After this is homogeneous it is then fed into the pelletizer, to prepare pellets of 1 to 4 mm in diameter. The sulfur particles used in the Sultech™ pellets comprised sulfur particles similar to those shown in FIG. 13, having for example SWM D[3,2] of 13.7 μm, a VWM [D4,3] of 23.7 μm and a d(0.5) of 19.0 μm, d(0.1) of 7.1 μm and d(0.9) of 44.2 μm, over a range of 2 μm to 45 μm.

One replicate of soil per treatment was sampled at Day 0, prior to adjusting the soil moisture, for available sulfate analysis.

The calculated volume of water for each desired soil moisture was measured into 1 L glass canning jars, then 500 g of treated soil per jar was added. Each jar was thoroughly mixed to evenly wet all soil, then lightly packed and smoothed the soil surface. The jar openings were covered with a single layer of pollination bag plastic to minimize evaporation without sealing the jar.

All jars were placed in Conviron™ growth cabinets under the described growth conditions:

1. Sub-tropic (30° C., 85% humidity, 27% soil moisture);
2. Prairie (25° C., 50% humidity, 22% soil moisture);
3. Semi-arid (30° C., 15% humidity, 20% soil moisture).

Six replicates per treatment were removed from each environment at Day 7, 14, 21, 28 and 35, and the soil collected in individual bags. Soil samples stored at −20° C. overnight to halt oxidation reactions. The soil samples were submitted on a weekly basis for available sulfate testing by Exova Laboratories using Sulfate Extractable by 0.1 M $CaCl_2$, 4.47 method (McKeague).

Results and Discussion

Figure 2:
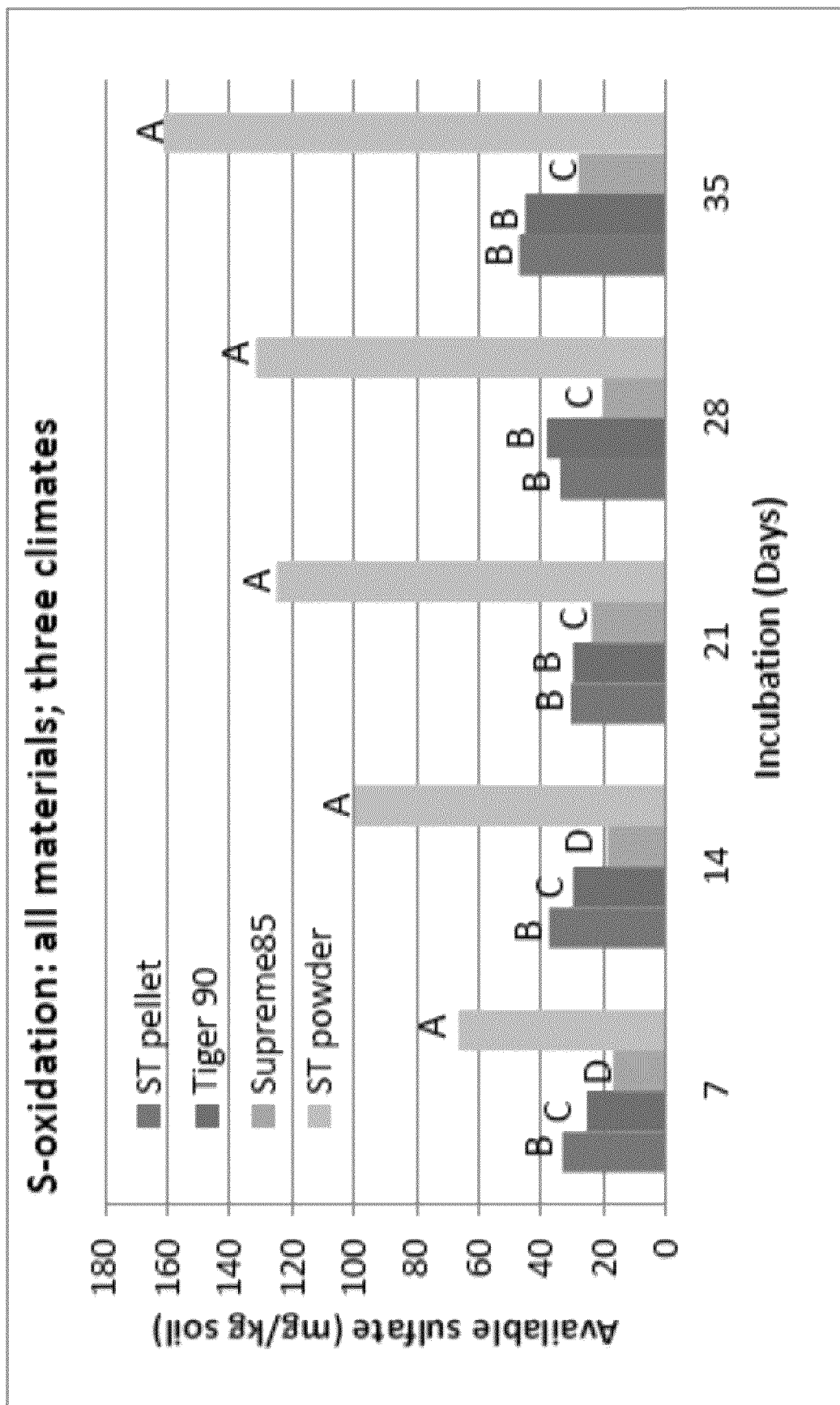
FIG. 2 illustrates a comparison of the formulation of tested materials (powder vs. pelleted) with respect to oxidation rate of elemental sulfur. Means within same incubation day with the same letter are not significantly different (Least Squared Differences at 0.05 probability level).

Linear increase of oxidation over time ($r^2$=0.964) of Sultech™'s (ST) elemental sulfur powder was observed regardless of the tested climatic conditions that varied in terms of ambient temperature, soil moisture and relative humidity (FIG. 2). This finding could be considered as an internal check clearly validating appropriateness of experimental conditions.

It was found that regardless of climatic conditions, non-pelleted Sultech™'s powder exhibited two to four times higher oxidation rates than both its pelletized equivalent and two commercially available granulated fertilizers (Tiger 90 and Supreme 85) (FIG. 2). This observation indicates that Sultech™'s powder product is readily available for soil microorganisms to convert the elemental sulfur to plant-available sulphate-sulfur. It also may indicate that average elemental S particle size in the powder makes this product a suitable feedstock for production of S fertilizer.

Figure 3:
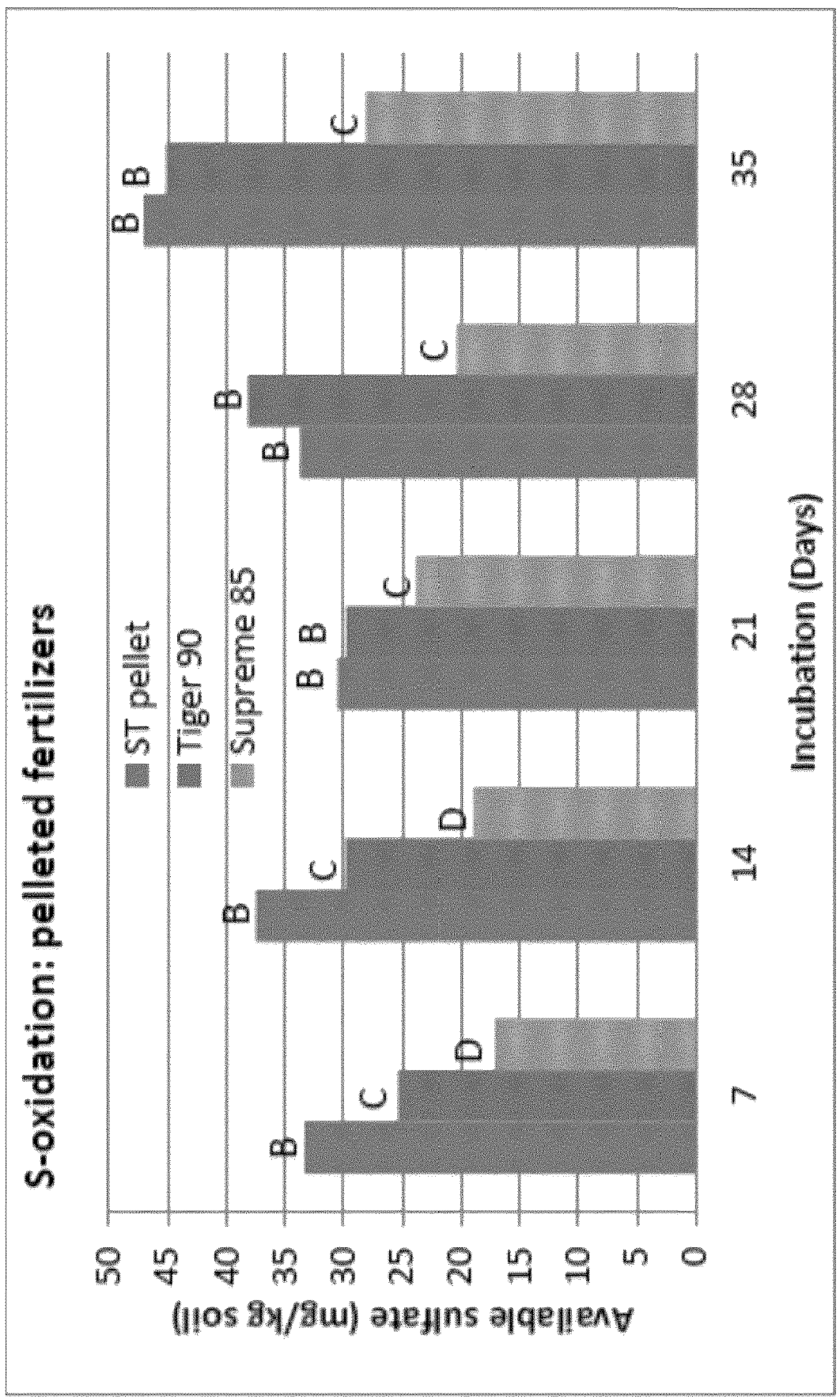
FIG. 3 illustrates a comparison of oxidation rate of Sultech pelletized elemental sulfur product with two commercial fertilizers. Means within same incubation day with the same letter are not significantly different (Least Squared Differences at 0.05 probability level).

When agglomerated, Sultech™'s product applied to soils imitating three distinguished climatic conditions appeared to offer either comparable or even superior oxidation rates than leading commercial fertilizers (FIG. 3). In particular, during the first two weeks of the experiment Sultech™'s product was oxidized significantly faster than both Tiger 90 and Supreme 85, while in the second part of the trial (Days 21-35) oxidation was on par with Tiger 90 and considerably higher than Supreme 85.

Figure 4:
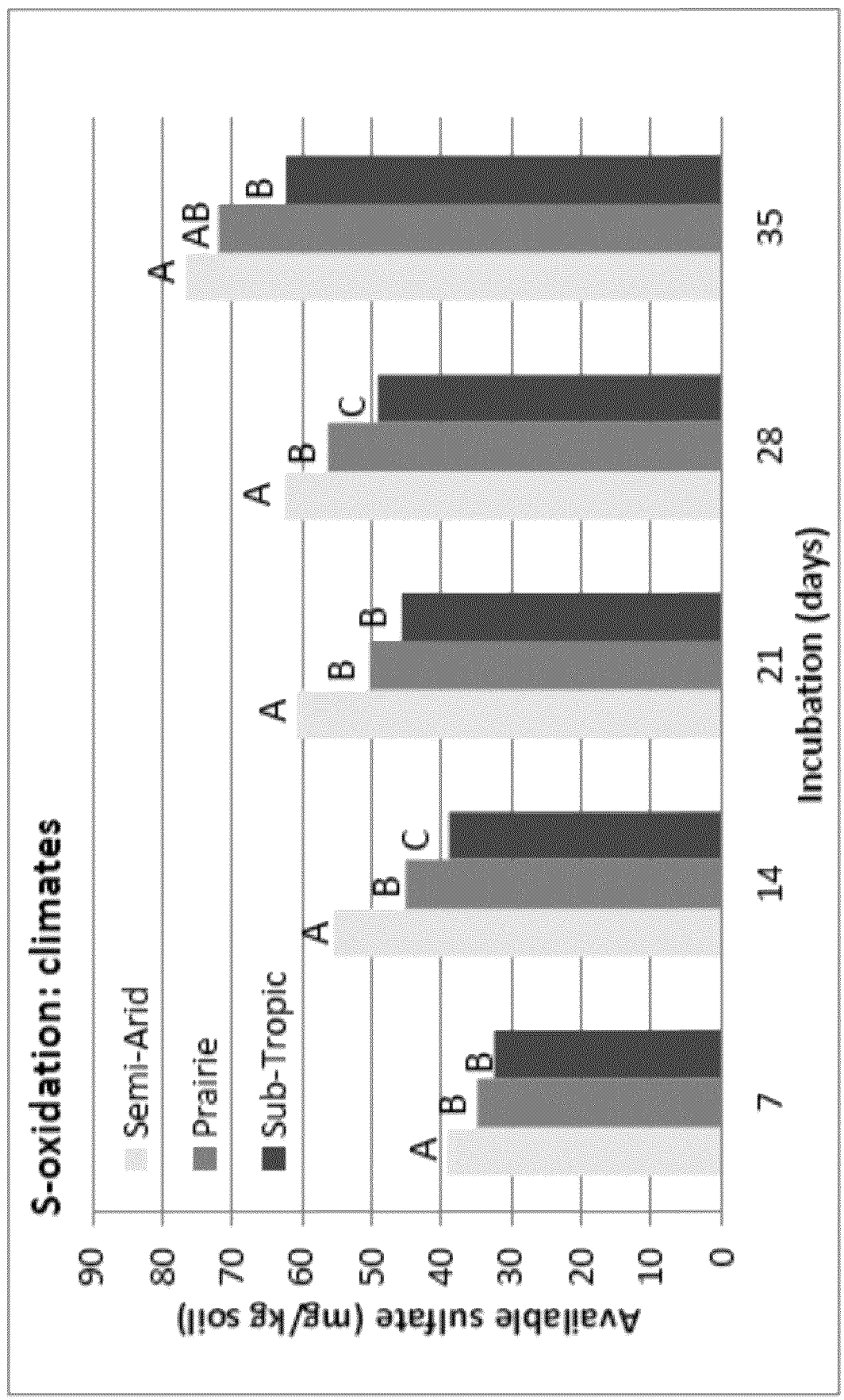
FIG. 4 illustrates a comparison of oxidation rate of pelletized sulfur fertilizers under different climatic conditions. Means within same incubation day with the same letter are not significantly different (Least Squared Differences at 0.05 probability level).

Climatic conditions substantially affected the rate of oxidation of elemental sulfur products. The highest conversion of S to plant available sulphate was reported under conditions simulating a semi-arid climate (30° C., 15% humidity, 20% soil moisture) (FIG. 4). Apparently high ambient temperature coupled with fairly low soil moisture and very low relative humidity created conditions under which the oxidation rate was significantly higher than under prairie and subtropical environments. This finding was somewhat unanticipated as according to literature data (Konopka et al 1986, Scherer 2001) lower soil moisture conditions are less favourable for effective oxidation. Apparently in our experiments, a soil moisture of 20% was not a limiting factor for high microbial activity. Perhaps the high temperature of 30° C. could sustain actively oxidizing bacteria despite the sub-optimal moisture content.

Surprisingly, the lowest oxidation was found under subtropical conditions of high soil moisture, temperature and humidity. This phenomenon could be explained by the fact that the high activity of sulfur oxidizing bacteria requires ample access to air in the soil. It is safe to assume that at high soil moisture content (27%) maintained during the course of the five weeks incubation period numerous capillary pores were occupied by water creating pockets of anaerobic conditions and thus impeding microbial activity and consequently, the conversion of S to sulfate. Under field conditions, such anaerobic conditions would be experienced only periodically, after heavy rains or in areas suffering from poor soil drainage.

Figure 5:
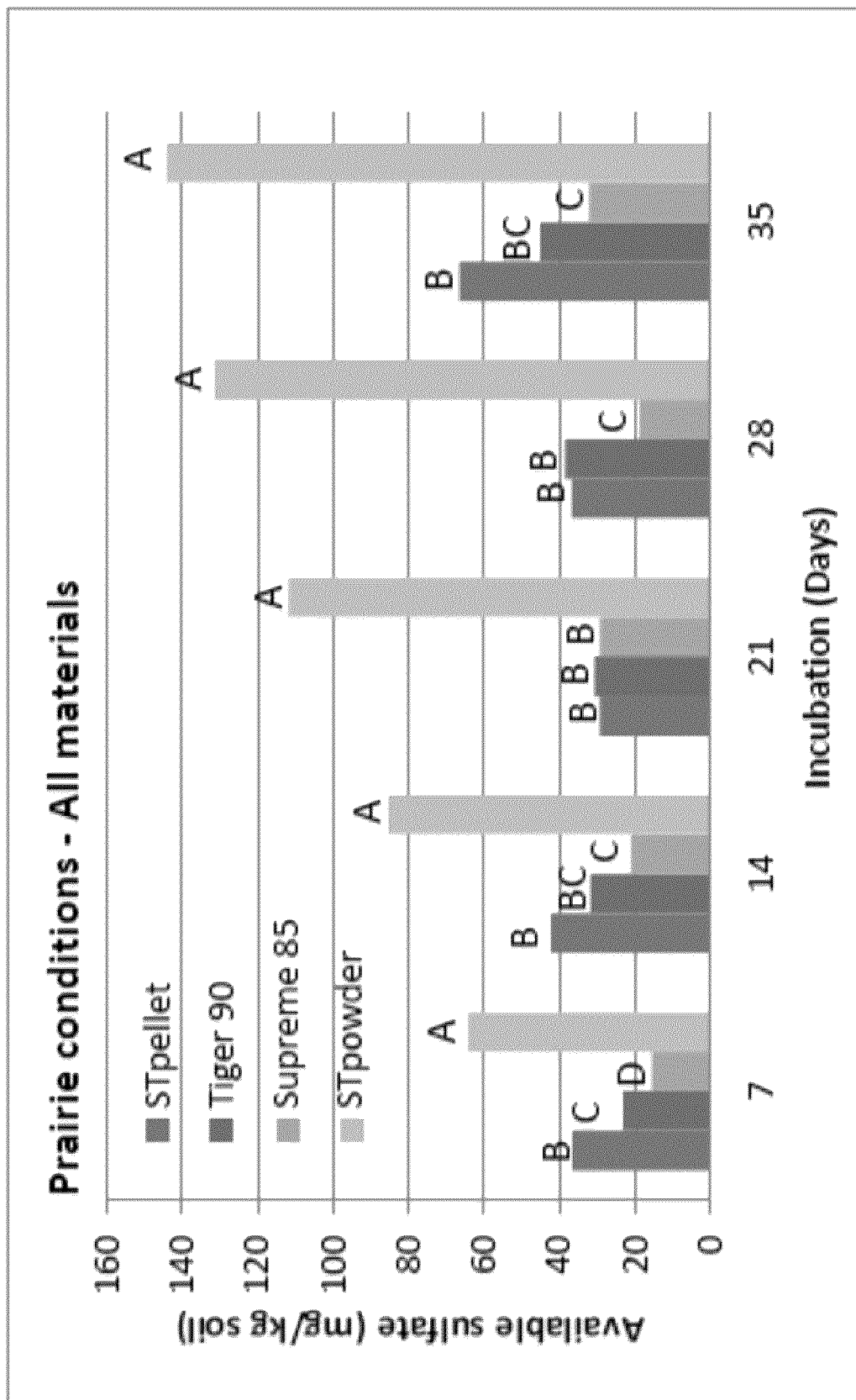
FIG. 5 illustrates a comparison of oxidation rate of sulfur fertilizers under conditions imitating Prairie climate. Means within same incubation day with the same letter are not significantly different (Least Squared Differences at 0.05 probability level).

Under the Prairie conditions (25° C., 50% humidity, 22% soil moisture) rapid oxidation of Sultech™'s powder occurred in a linear fashion ($r^2$=0.9868), which indicates its immediate availability for colonization by soil chemolitothrophic bacteria, most likely due to suitable particle size of the product (FIG. 5). These observations also confirm that incubation conditions created in the chamber were appropriate for good growth of soil microbes.

Oxidation of the powder was 2-4 time faster than Sultech™'s pelletized product. This finding was anticipated since it is desired to assure continuous availability of S during the growing season. Swift oxidation of the powder under field conditions would lead to several unwanted consequences including soil acidification and leaching of unused sulfate to deeper layers of soil.

Figure 6:
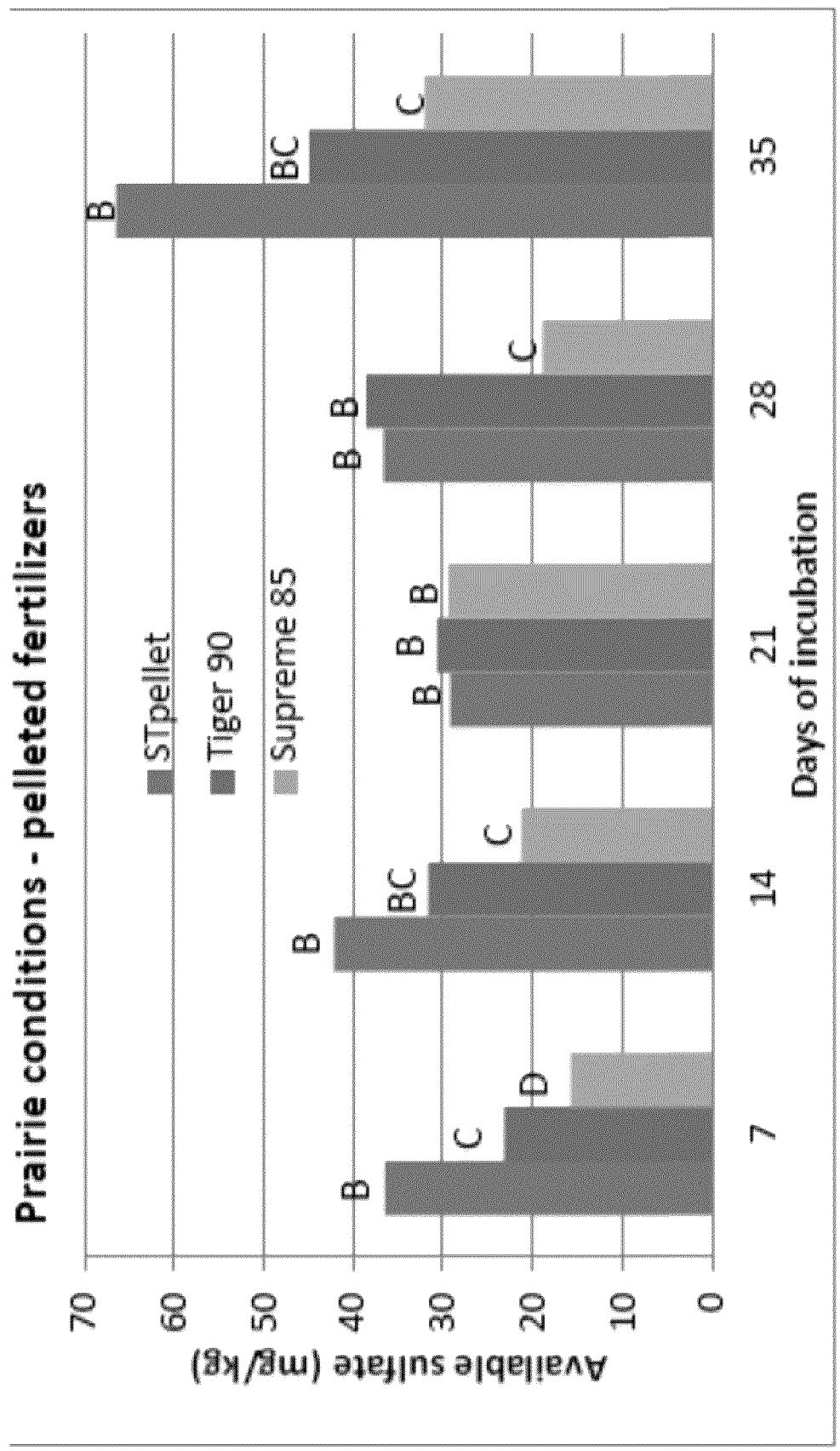
FIG. 6 illustrates a comparison of oxidation rates of pelletized sulfur fertilizers under conditions imitating Prairie climate. Means within same incubation day with the same letter are not significantly different (Least Squared Differences at 0.05 probability level).

Under the Prairie conditions pelletized Sultech™'s powder preformed significantly better than two other commercial products, particularly better than Supreme 85 (FIG. 6). Its superiority which was particularly evident during first two weeks of incubation seems to be an advantageous feature allowing for a prompt supply of readily available sulfate to rapidly developing seedlings of canola or other S demanding crops. Faster oxidation rates of Sultech™'s pellets was also observed in the latter portion of the experiment (Day 35) indicating a high potential of the product to outcompete competitors during the entire growing season.

Figure 7:
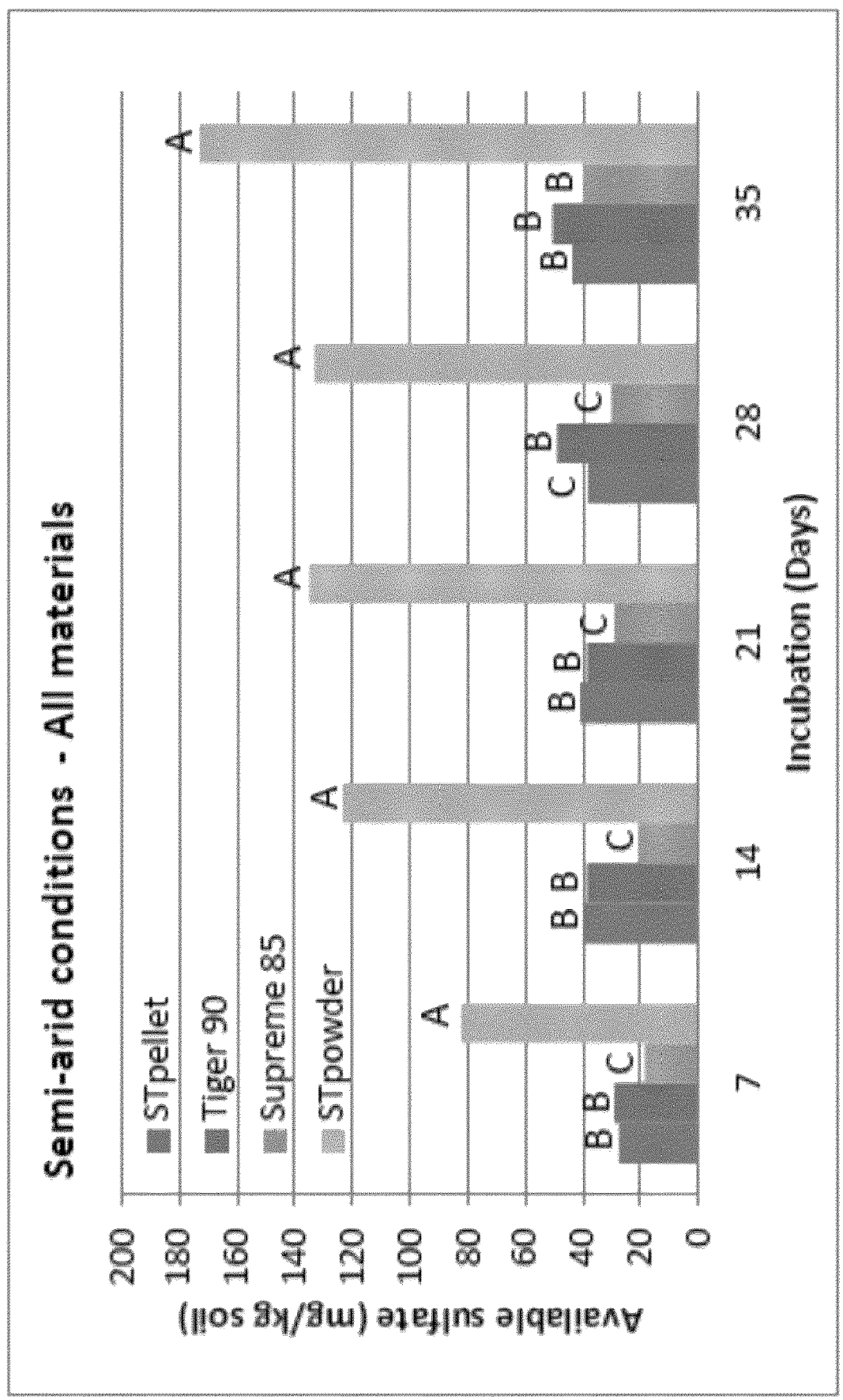
FIG. 7 illustrates a comparison of oxidation rate of sulfur fertilizers under conditions imitating semi-arid climate. Means within same incubation day with the same letter are not significantly different (Least Squared Differences at 0.05 probability level).

Under semi-arid conditions characterized by high temperature of 30° C., low humidity of 15% and the lowest (20%) soil moisture among the three tested climate scenarios, the oxidation rate of Sultech™'s powder over the five weeks period diverted slightly from linearity ($r^2=0.8717$) (FIG. 7). A noticeable slow down period occurred between 14 and 28 days, after which oxidation processes resumed to reach the highest value among all climates on Day 35 (see FIG. 4). This pattern of response could be perhaps attributed to suboptimal environmental condition for growth of bacteria that needed some time to adjust their metabolism to the less favorable milieu. Nevertheless, oxidation rate of the powder was 3-4 times higher than the pelleted materials, similarly to values reported for other climates.

Figure 8:
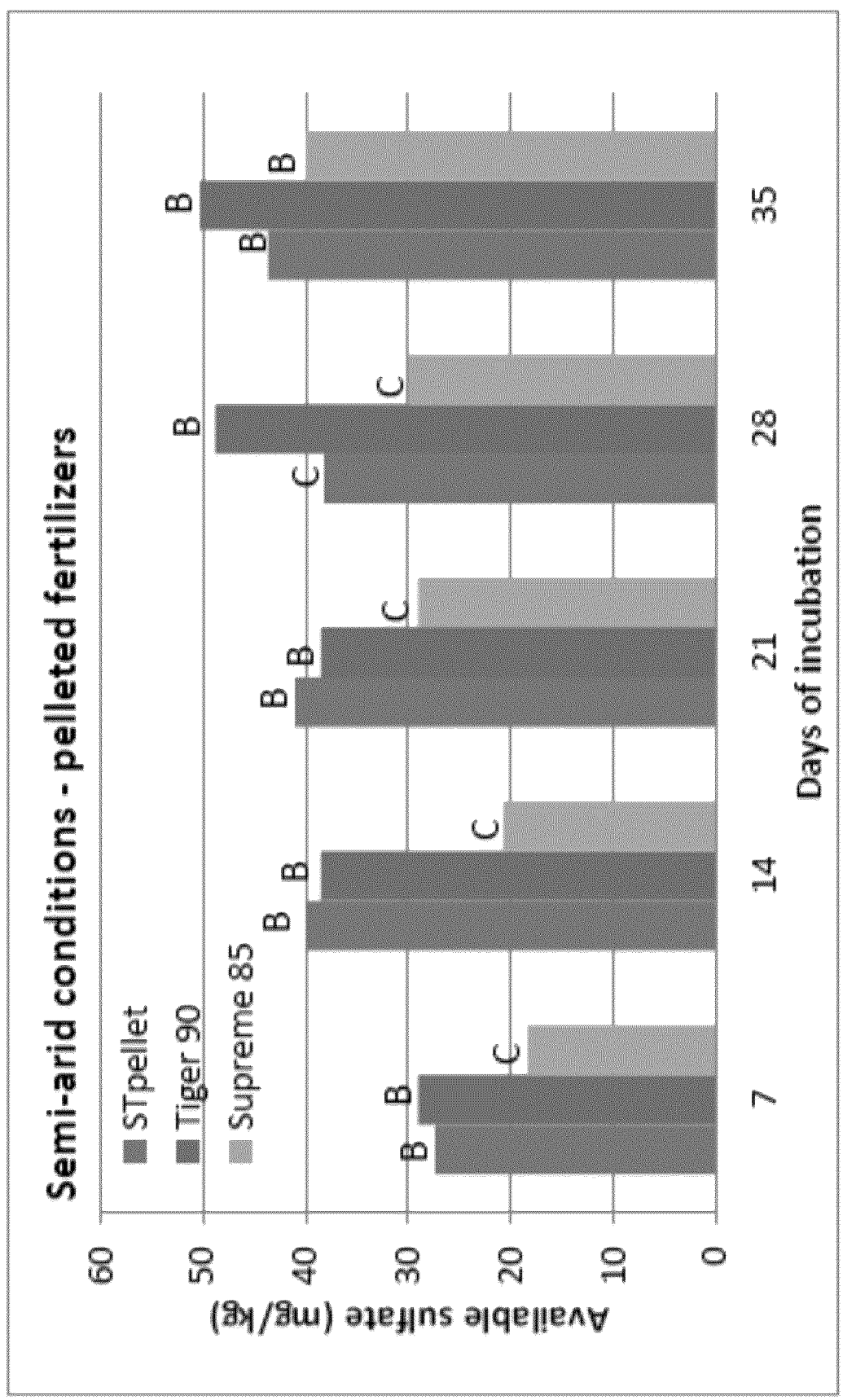
FIG. 8 illustrates a comparison of oxidation rate of pelletized sulfur fertilizers under conditions imitating semi-arid climate. Means within same incubation day with the same letter are not significantly different (Least Squared Differences at 0.05 probability level).

Under semi-arid conditions no significant differences in terms of oxidation rate between pelletized Sultech™'s product and Tiger 90 could be identified (FIG. 8). Sultech™'s product, however, was oxidized 30-40% faster than Supreme 85 and these substantial differences were particularly noticeable during the first portion of the incubation experiment. It is worth mentioning that the oxidation rate of Sultech™'s pelletized product did not significantly change after the second week of incubation, which may be an indication of a limited colonization of S pellets under drier soil conditions. Indirectly, it could point to a slower disintegration of Sultech™'s agglomerates and could perhaps advocate for a need for modifying the stability of pellets meant for application in very dry climates.

Figure 9:
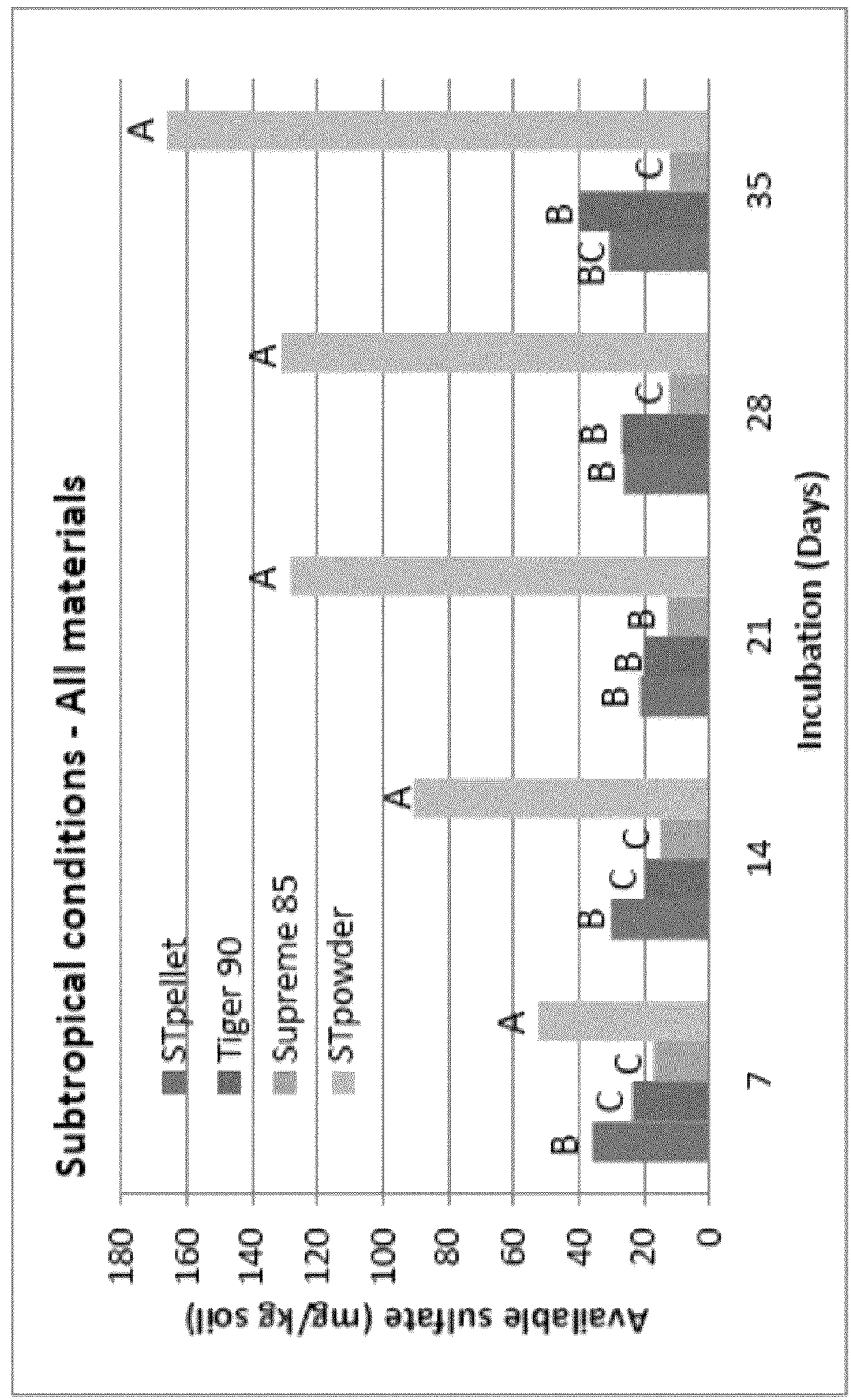
FIG. 9 illustrates a comparison of oxidation rates of sulfur fertilizers under conditions imitating sub-tropical climate. Means within same incubation day with the same letter are not significantly different (Least Squared Differences at 0.05 probability level).

Steep, perfectly linear ($r^2=1$) rate of oxidation of Sultech™'s powder was reported during the first three weeks of incubation in a chamber imitating sub-tropical conditions (30° C., 85% humidity, 27% soil moisture) (FIG. 9). An evident, yet transient, stagnation of oxidation occurred in the fourth week (Day 28) followed by a substantial increase of conversion of elemental S to sulfate in the last week of the experiment. Interestingly, under the sub-tropical climate scenario Sultech™'s powder oxidized noticeably faster (5-10 times) than the pelletized products (FIG. 9). Limited oxygen accessibility caused by occupation of soil capillaries by the water in the zones surrounding S agglomerates could be a key factor. Further studies aimed at elucidation of this phenomenon could be performed, subject to funds availability.

Figure 10:
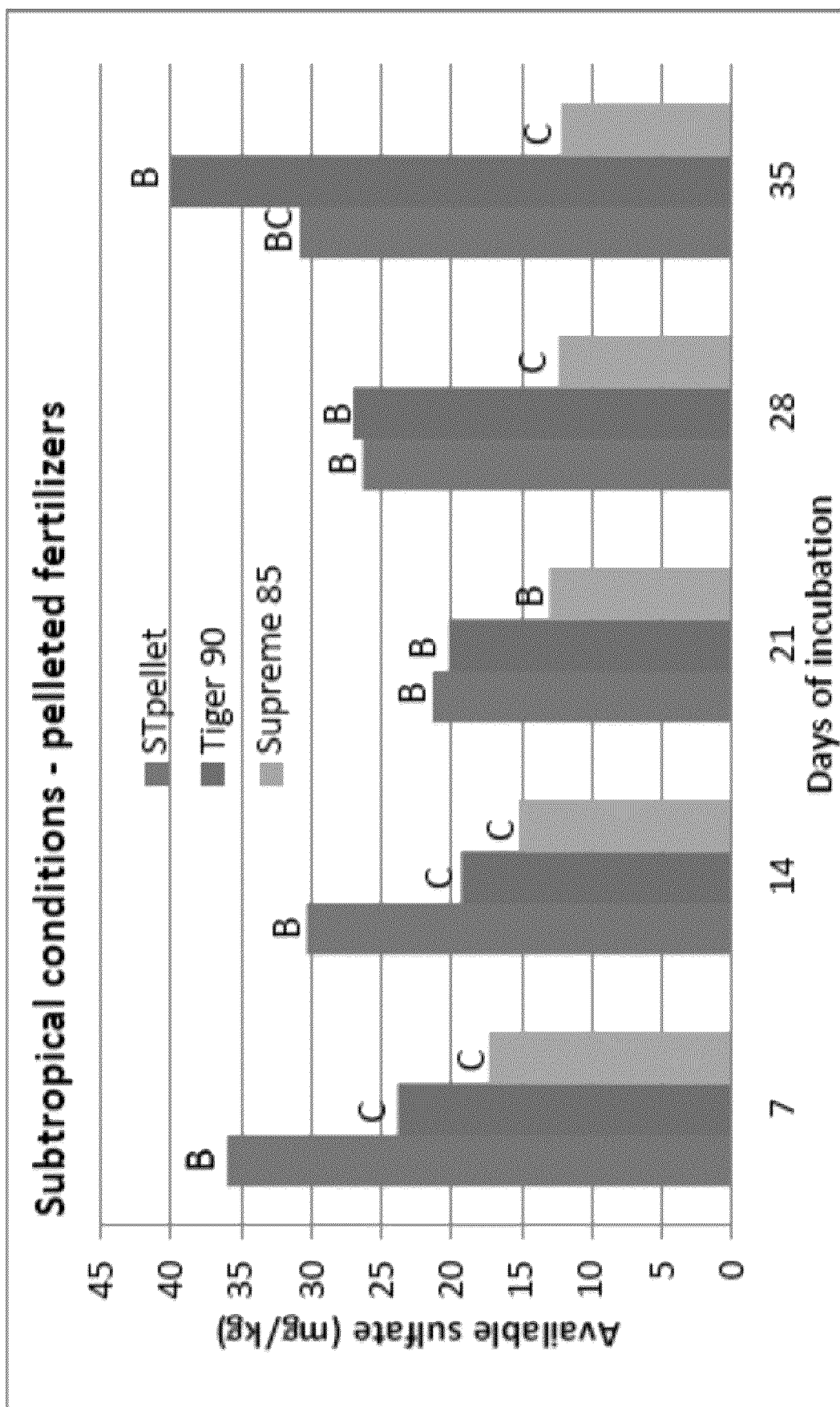
FIG. 10 illustrates a comparison of oxidation rate of pelletized sulfur fertilizers under conditions imitating sub-tropical climate. Means within same incubation day with the same letter are not significantly different (Least Squared Differences at 0.05 probability level).
Figure 11:
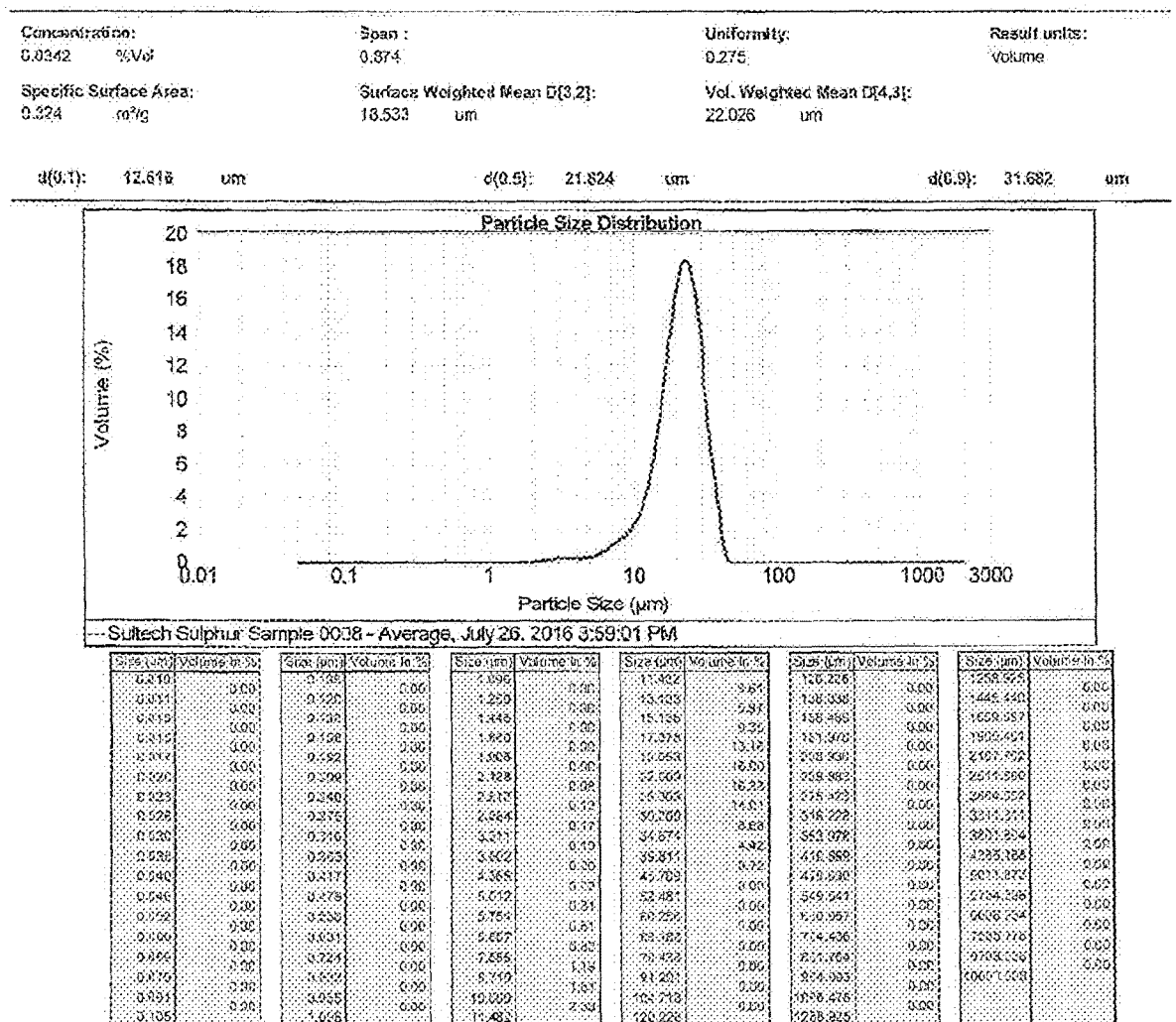
FIG. 11 illustrates a particle size distribution of sulfur particles prepared with a method according to an embodiment of the present invention.

Rapid oxidation of Sultech™'s pelletized material was recorded during the first two weeks of incubation under sub-tropical conditions (FIG. 10). During this period the rate of conversion of elemental S to sulfate was significantly faster than two other commercial products. However, in the remaining three weeks of the experiment no substantial differences between Sultech and Tiger 90 could be found. Strikingly, oxidation of the pelletized Sultech's product dropped around 30% on Day 21 of the trial and started recovering slowly afterwards. Impediment of oxidation of Tiger 90 during this period was also evident, but recuperation happened at a faster rate. Interestingly, under sub-tropical conditions a continuous reduction of oxidation rate over time of Supreme 85 was reported (FIG. 10).

As discussed above, the observed inconsistent patterns of oxidation rate among all pelletized products could be conceivably attributed to oxygen deprivation in the vicinity of S agglomerates. Since thiobacilli colonizing sulfur fertilizer particles are obligated aerobes any anaerobic conditions impede the oxidation processes. One can hypothesize that an apparent recovery of oxidation observed in Sultech™ and Tiger 90 products might be a result of soil drying that restored conditions allowing for the penetration of oxygen through soil pores otherwise filled by water. Although incubation jars were covered with air-permeable caps meant to limit evaporation some water loses were not avoidable at ambient temperatures of 30° C. It is safe to assume that under field conditions where soil is not continuously saturated with water, impediments of oxidation of pelletized fertilizers should not be a major issue. Certainly, field trails would be an ultimate proof of this supposition.

Conclusions

1. Sultech™'s powder material exhibited unprecedented oxidation rate exceeding 2-10 times oxidation of the other pelletized materials. These data indicate that the size of elemental S in the Sultech™'s feedstock is appropriate for easy colonization by chemolitothrophic bacteria and consequently for efficient oxidation processes.

2. Climatic conditions substantially affected the rate of oxidation of all elemental sulfur products. The highest conversion of S to plant available sulphate was reported under conditions simulating semi-arid climate while the lowest oxidation was found under subtropical conditions of high soil moisture, temperature and humidity. This phenomenon could be attributed to oxygen deprivation in partially waterlogged subtropical soil.

3. Overall oxidation rates of Sultech™'s pelletized material across three tested climatic conditions appeared to be superior or equivalent to two commercial S fertilizers (Tiger 90 and Supreme 85). In particular, Sultech's product was significantly and consistently better than Supreme 85.

4. Under imitated climatic conditions of the Prairies (ambient temperature 25° C., 50% humidity, 22% soil moisture) Sultech™'s pelletized product exhibited significantly higher oxidation rates during the course of five week incubation period than the commercial products.

5. Under semi-arid and sub-tropical conditions, the oxidation rate of Sultech's material was comparable to Tiger™ 90, while faster than Supreme™ 85.

6. Greenhouse and field trails that involve cultivation of high S-demanding crops should be conducted to verify the apparent outstanding capacity of Sultech's material as a novel sulfur fertilizer.

Example 3

Evaluation of Novel Elemental Sulfur Fertilizer

The objectives of the present study are to determine the sulphate release from a sulfur (S) suspension fertilizer according to the present invention, spray-applied onto different soil types and subjected to Alberta, Canada environmental conditions during the growing season, to compare soil sulphate levels during the growing season, canola S uptake, and canola seed yield from the sulfur (S) suspension fertilizer according to the present invention with spray-applied AS, and determine if there are crop S uptake and yield response differences between the sulfur (S) suspension fertilizer according to the present invention treatments and sprayed or banded AS.

2018 Field Research Activities

The evaluation of the sulfur (S) suspension fertilizer according to the present invention began in 2018 to determine if soil S changes during the growing season, plant uptake of S, and yield measurements are sensitive enough to detect S fertilizer product and/or rate differences between control treatments, AS, and the S suspension fertilizer. In early spring of 2018, Agriculture and Forestry (AF) identified a research site in southern Alberta (Glenwood) and a second site in north-central Alberta (Radway), on Orthic Black Chernozem, and Dark Gray Luvisol soils respectively (Table 1).

TABLE 1

Site location and soil

| | Legal Location | Soil Group | Soil Series |
|---|---|---|---|
| Radway | NW-30-58-20-W4 | Dark Gray Luvisol | Spedden |
| Glenwood | NW-1-5-27-W4 | Orthic Black Chernozem | Cardston |

The Glenwood and Radway sites both had reasonably low soil test S levels in the 0-15 cm depth (Table 2). Although neither site would be considered S deficient, the soil S levels at Radway and Glenwood are lower than most commercial canola production land that has been fertilized with S, primary because of the canola in rotation.

TABLE 2

Soil test nitrate and sulphate at Radway and Glenwood spring 2018

| | Radway | | Glenwood | |
|---|---|---|---|---|
| Depth | $NO_3^-$ | $SO_4^{2-}$ | $NO_3^-$ | $SO_4^{2-}$ |
| | ppm | | | |
| 0-15 cm | 9 | 5 | 10 | 6 |
| 15-30 cm | 5 | 5 | 8 | 13 |
| 30-60 cm | 3 | 6 | 5 | 28 |

At each site nine treatments were applied using a randomized complete block design (RCBD) and four replicates for a total of 36 plots per site. Treatments were:
1. Control treatment—no S fertilizer applied
2. 20 kg S/ha using AS (spray grade) spray applied in early spring; No incorporation
3. 40 kg S/ha using AS (spray grade) spray applied in early spring; No incorporation
4. Control treatment—no S fertilizer applied
5. 20 kg S/ha using Sulgro 70 spray applied in early spring; No incorporation
6. 40 kg S/ha using Sulgro 70 spray applied in early spring; No incorporation
7. Control treatment—no S fertilizer applied
8. 20 kg S/ha using granular AS side or mid-row banded at time of planting
9. 40 kg S/ha using granular AS side or mid-row banded at time of planting At each site, the S suspension fertilizer according to the present invention and spray grade AS treatments (Treatments 2-3, and 5-6) were applied as early as possible in the spring. Due to late snow-melt and cold, wet soils, the sprayed-S treatments planned for mid-April application were not applied until May, and seeding was also delayed into May (Table 3).

At each site all spray treatments were applied on the same day. All sites were direct seeded into cereal stubble in May with an appropriate herbicide tolerant hybrid. At the time of seeding, the side (Glenwood) or mid-row (Radway) banded granular AS treatments (Treatments 8-9) were applied. Nitrogen (urea) was mid-row banded at seeding at Radway and side-banded at Glenwood. The N in AS treatments was accounted for and urea application was adjusted so N fertilizer applied was equal in all treatments. Ammonium phosphate was seed-placed at 15 kg $P_2O_5$ ha-1 with any additional required phosphate dual-banded with the urea.

At seeding, plots were approximately 2 m wide by 10 m long. Plant stand density, based on 1 m of seed row in two places per plot, was determined about 3 weeks after emergence. Prior to flowering, plots were trimmed to a uniform length according to normal operations for the research groups.

Plant Root Simulator (PRS) probes (Western Ag Innovations, Saskatoon, SK) are ion exchange membranes in a plastic support that adsorb $SO_4^2$ and other ions when buried in soil. On the day of seeding four PRS probes were installed in each plot of treatments 1 to 6 (controls and treatments with spray-applied S) of each replicate. In these treatments, S application was uniform across the plot area. PRS probes were not buried in the banded AS treatments as PRS placement relative to the fertilizer band would greatly affect results. About four weeks after planting, all PRS probes were removed from treatments 1 to 6, and replaced with a new set of PRS probes in the same treatments, for another four weeks, and then removed for analysis (Table 3).

Near the end of flowering, while the majority of leaves were still intact, canola biomass samples were cut from one end of each plot at each site. These biomass samples were about 1 m of plot length×plot width, or roughly 2 $m^2$. The biomass sample was weighed in the field, chopped, and subsampled. The subsample was dried and weighed. In the late fall and winter of 2018-19, these biomass samples will be ground, and analyzed for total S content by combustion. Total S uptake will be determined from this biomass sample.

The plot area remaining after biomass sampling, at both the Radway and Glenwood sites, was harvested under high grain moisture conditions with a small plot combine on September 25. These samples will be dried and cleaned to determine grain yield for each treatment. Final yield will be adjusted to 8.5% moisture basis.

The 2018 growing season at both sites was drier than normal and warmer than normal (Table 4). May in particular was dry, especially at the Radway site, and it was thought that the dry surface soil environment did not favor microbial oxidation of elemental Sulfur. Even though heat accumulation throughout the growing season was greater than normal, combining at both sites was delayed well into September, possibly due to prolonged wildfire smoke-related conditions in August, and cool weather in September.

TABLE 3

Field activities at Radway and Glenwood 2018

| Site | S sprayed | Hybrid | Seeded | PRS Burial/retrieval | Biomass |
|---|---|---|---|---|---|
| Radway | May 4 | L135C | May 8 | 1. May 8-June 5 | July 24 |
| | | | | 2. June 5-July 3 | |
| Glenwood | May 8 | Nexera 1026 RR | May 16 | 1. May 16-June 13 | July 27 |
| | | | | 2. June 13-July 11 | |

TABLE 4

Table 4. Growing season rainfall and Growing Degree Day 2018 accumulations and long-term normals at Radway and Glenwood Alberta[1]

| | Radway | | | | Glenwood | | | |
| --- | --- | --- | --- | --- | --- | --- | --- | --- |
| | Rainfall (mm) | | GDD (base 5C) | | Rainfall (mm) | | GDD (base 5C) | |
| Month | Actual | Normal | Actual | Normal | Actual | Normal | Actual | Normal |
| May | 16 | 44 | 279 | 178 | 44 | 83 | 262 | 138 |
| June | 104 | 79 | 305 | 282 | 67 | 102 | 263 | 243 |
| July | 65 | 87 | 362 | 356 | 57 | 48 | 364 | 354 |
| August | 47 | 59 | 308 | 323 | 61 | 53 | 381 | 339 |
| September 1-15 | 29 | 24 | 60 | 98 | 11 | 31 | 102 | 111 |
| Total | 261 | 293 | 1314 | 1237 | 240 | 317 | 1372 | 1185 |

[1]Based on the Alberta Climate Information Service weather stations nearest to the research sites ("Radway", and "Cross Drain 5")

Partial Preliminary Results and Discussion

This report is based on PRS data from the two burial periods during May to early July. Unlike conventional soil sampling and analysis that report soil test values in parts per million or pounds per acre, PRS probes provide a measure of nutrient supply per unit area over the burial period: milligrams of nutrient per square meter of membrane over the burial period.

Due to error not being normally distributed, statistical analysis of the PRS data for the first burial period at Glenwood was performed on log-transformed data (Table 5). One extremely low data point from the AS spray-applied at 40 kg S ha$^{-1}$ treatment was removed as an outlier from the Glenwood data during the second burial interval. All Radway data, from both burial times, were included in the analyses.

At both sites for each burial period, the four sprayed-S treatments significantly affected S supply rate on the PRS probes compared to the control (Table 5). The S supply rate due to AS application tended to be greater at Glenwood than at Radway (Table 5). At Radway during the first burial, the S supply rates in the AS treatments were greater than the control, while the S supply rates of the S suspension according to the invention treatments were intermediate, not significantly different from the AS treatments or control. At Glenwood during this first burial, the S supply rates of all sprayed-S treatments were greater than the control, the treatments with the S suspension fertilizer according to the present invention were equal to each other, AS 20 was greater than both S suspension fertilizer treatments, and AS 40 was greater than AS 20 (and both S suspension fertilizer treatments). During the second burial period at Radway, all sprayed-S treatments had greater S supply rates than the control; AS 20, the S suspension fertilizer according to the present invention referred to as Sulgro 20 and Sulgro 40 had equal S supply rates; and AS 40 had a greater S supply rate than all other treatments. At Glenwood during the second burial, the treatment rankings were: AS 40>AS 20=Sulgro 40>Sulgro 20>control. Based on S supply rates determined using PRS probes, there is evidence that S suspension fertilizer according to the present invention S is oxidizing within weeks of application (Table 5).

TABLE 5

Sprayed sulfur treatment effects on soil S supply rate at Radway and Glenwood as measured by in situ PRS probes at 3-10 cm depth for two 4-week burial periods during May, June, and early July 2018. Means within columns followed by the same letter are not significantly different according to the LSD test ($p < 0.05$)

| | Burial 1 | | | Burial 2 | |
| --- | --- | --- | --- | --- | --- |
| | | Glenwood | | | Glenwood one extremely low AS 40 outlier excluded |
| | Radway | log10 | detransformed | Radway | |
| | all data | transformed | mean | all data | |
| Probability of treatment effect from ANOVA | 0.033 | <0.001 | — | <0.001 | <0.001 |
| Treatments | mg S m$^{-2}$ membrane per burial period (not cumulative) | | | | |
| Control[1] (no S fertilizer) | 80 b | 1.90 d | 79 | 86 c | 69 d |
| AS 20 | 178 a | 2.55 b | 354 | 169 b | 265 b |
| AS 40 | 168 a | 2.66 a | 453 | 221 a | 381 a |
| Sulgro 20 | 133 ab | 2.09 c | 124 | 166 b | 126 c |
| Sulgro 40 | 123 ab | 2.16 c | 146 | 166 b | 218 b |

[1]There were two control plots per block, and four blocks. Control results are based on the mean of these 8 data points.

For this project, the relative ability of products according to the present invention to supply S compared to conventional AS can be estimated using the following formula:

$$\text{Relative } S \text{ supply rate} = \frac{S \text{ supply rate by Sulgro treatment} - \text{control}}{S \text{ supply rate by AS treatment} - \text{control}} \times 100$$

The relative S supply rate of Sulgro ranged from 48% to 96% at Radway, and 16% to 48% at Glenwood (Table 6). Relative S supply rates at both sites tended to be greater during the second rather than the first burial period.

TABLE 6

The relative ability of Sulgro products to supply S compared to spray-applied ammonium sulphate at Radway and Glenwood during each of two four-week burial periods in May through early July 2018 (not cumulative)

|  | Burial 1 | | Burial 2 | |
| --- | --- | --- | --- | --- |
|  | Radway all data | Glenwood all data | Radway all data | Glenwood one extremely low AS 40 outlier excluded |
| Treatments | Relative S supply rate (%) | | | |
| Sulgro 20 | 54 | 16 | 96 | 29 |
| Sulgro 40 | 48 | 18 | 57 | 48 |

There are several positive results from this study. Even though research sites had reasonable S levels and were not S deficient, the PRS probes were able to detect treatment differences between control treatments with no S fertilizer and treatments that received S, and in some cases differences between different treatments that received S fertilization. There is also good evidence that S from products according to the present invention without incorporation is oxidizing within weeks of application. At worst, the S oxidized appears to be about 16% of the S applied as AS, but at best could be essentially equal to AS, depending on soil and environmental conditions from an agronomic perspective.

REFERENCES

1. Agri-Facts (2013) Sulfur fertilizer application in crop production. p. 8, Agdex 542-10.
2. Germida J. J., Janzen H. H. (1993) Factors affecting the oxidation of elemental sulfur in soils. Fertilizer Research 35, 101-114.
3. Konopka, A. E., R. H. Miller, and L. E. Sommers (1986) Microbiology of the sulfur cycle, p. 23-56. In M. A. Tabata-bai (ed.), Sulfur in agriculture. Am. Soc. Agronomy.
4. Scherer H. W. (2001) Sulfur in crop production. European Journal of Agronomy 14, 81-111.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A method of producing sulfur particles, comprising the step of:
   injecting an unbroken stream of a molten sulfur under a pulsation free pressure of from about 3447.38 kPa to about 20684.27 kPa, from a distance of about 30 to about 101 mm, into a tempered water moving at velocity, to produce a physical reaction of said molten sulfur with said tempered water to produce sulfur particles.

2. The method of claim 1, wherein said tempered water is moving at velocity sufficient to produce a vortex.

3. The method of claim 2, wherein moving at a velocity comprises driving said tempered water in a circular motion with sufficient angular velocity as to produce a vortex.

4. The method of claim 3, wherein said vortex is provided by a dual impeller vertical mixer.

5. The method of claim 4, wherein said dual impeller vertical mixer comprises an upper impeller configured to induce a smooth laminar flow across the liquid surface of said tempered water.

6. The method of claim 4, wherein said dual impeller vertical mixer comprises a lower impeller configured to create a tight vortex of micronized sulfur slurry to assist flow of said sulfur particles.

7. The method of claim 2, wherein said moving at a velocity provides a homogeneous sulfur particles and water slurry.

8. The method of claim 7, wherein said homogenous sulfur particles and water slurry comprises about 10% w/w sulfur particles.

9. The method of claim 1, further comprising the step of filtering said sulfur particles or said homogeneous sulfur particles and water slurry for retention of coarse sulfur particles and providing filtered sulfur particles or a filtered homogeneous sulfur particles and water slurry.

10. The method of claim 9, further comprising the step of centrifugation of said filtered sulfur particles or said filtered homogeneous sulfur particles and water slurry to provide a wet elemental sulfur paste and a white water.

11. The method of claim 10, wherein said white water is treated to recover fine sulfur particles for further processing.

12. The method of claim 9, wherein said filtering is with a filter of about 150 μm (100 mesh).

13. The method of claim 1, wherein said tempered water further comprises a surfactant.

14. The method of claim 13, wherein said surfactant is carboxymethyl cellulose having a degree of substitution of equal to or less than 0.5.

15. The method of claim 14, wherein said degree of substitution is between about 0.4 to 0.5, or between about 0.4 and 0.45.

16. The method of claim 1, wherein said pulsation free pressure is from a pump having reduced pulsations compared to a pump having a single, or dual high pressure hydraulic cylinder.

17. The method of claim 1, wherein said molten sulfur is degassed molten sulfur.

18. The method of claim 1, wherein said pulsation free pressure is provided with a pump having 3 or more hydraulic cylinders.

19. The method of claim 1, wherein said distance is from about 30 to about 76 mm or about 33 to about 76 mm.

20. The method of claim 1, wherein said molten sulfur is heated to a temperature of about 140° C. to about 159° C. or from about 150° C. to about 155° C.

21. The method of claim 1, wherein said tempered water is heated to a temperature of about 15° C. to about 98° C. or about 50° C. to about 98° C. or about 94° C. to about 98° C.

22. The method of claim 1, wherein said tempered water is moving at velocity of at least 0.5 meter per second.

\* \* \* \* \*